(12) United States Patent
Prutchi et al.

(10) Patent No.: US 12,551,707 B2
(45) Date of Patent: Feb. 17, 2026

(54) MEANS AND METHODS FOR USING NON-EXCITATORY ELECTRICAL HEART FAILURE THERAPY AS A THERAPY FOR HEART FAILURE WITH PRESERVED EJECTION FRACTION

(71) Applicant: Impulse Dynamics NV, Willemstad (CW)

(72) Inventors: David Prutchi, Voorhees, NJ (US); Simeon Ioannis Kedikoglou, Tallahassee, FL (US); Tamir Ben David, Tel-Aviv (IL)

(73) Assignee: Impulse Dynamics NV, Willemstad (CW)

( * ) Notice: Subject to any disclaimer, the term of this patent is extended or adjusted under 35 U.S.C. 154(b) by 0 days.

(21) Appl. No.: 17/857,085

(22) Filed: Jul. 4, 2022

(65) Prior Publication Data

US 2023/0001204 A1    Jan. 5, 2023

Related U.S. Application Data

(60) Provisional application No. 63/217,813, filed on Jul. 2, 2021.

(51) Int. Cl.
*A61N 1/00* (2006.01)
*A61N 1/362* (2006.01)
*A61N 1/365* (2006.01)

(52) U.S. Cl.
CPC ....... *A61N 1/3628* (2013.01); *A61N 1/36507* (2013.01); *A61N 1/36571* (2013.01); *A61N 1/36578* (2013.01)

(58) Field of Classification Search
None
See application file for complete search history.

(56) References Cited

U.S. PATENT DOCUMENTS

| | | | |
|---|---|---|---|
| 4,554,922 A | 11/1985 | Prystowsky et al. | |
| 5,372,607 A | 12/1994 | Stone et al. | |
| 6,233,487 B1 | 5/2001 | Mika et al. | |
| 6,263,242 B1 | 7/2001 | Mika et al. | |
| 6,370,430 B1 | 4/2002 | Mika et al. | |
| 6,480,737 B1 | 11/2002 | Policker et al. | |
| 6,597,952 B1 | 7/2003 | Mika et al. | |
| 6,725,093 B1 | 4/2004 | Ben-Haim et al. | |

(Continued)

FOREIGN PATENT DOCUMENTS

| | | |
|---|---|---|
| CA | 2459408 | 3/2003 |
| CN | 1787850 | 6/2006 |

(Continued)

OTHER PUBLICATIONS

Eisman et al. (2018). Pulmonary capillary wedge pressure patterns during exercise predict exercise capacity and incident heart failure. Circulation: Heart Failure, 11(5). https://doi.org/10.1161/circheartfailure.117.004750 (Year: 2018).*

(Continued)

*Primary Examiner* — John R Downey
*Assistant Examiner* — Anant A Gupta

(57) ABSTRACT

The present invention relates to non-excitatory electrical heart failure therapy as a therapy for Heart failure with preserved ejection fraction.

9 Claims, 17 Drawing Sheets

(56) References Cited

U.S. PATENT DOCUMENTS

| | | | |
|---|---|---|---|
| 6,993,385 B1* | 1/2006 | Routh | A61N 1/3621 |
| | | | 607/4 |
| 7,027,863 B1 | 4/2006 | Prutchi et al. | |
| 7,519,426 B1 | 4/2009 | Koh et al. | |
| 7,634,310 B2 | 12/2009 | Lee et al. | |
| 7,953,481 B1 | 5/2011 | Shemer et al. | |
| 7,991,469 B2 | 8/2011 | Schwartz et al. | |
| 8,634,910 B2* | 1/2014 | Stahmann | A61N 1/3686 |
| | | | 607/9 |
| 8,977,353 B2 | 3/2015 | Rousso et al. | |
| 9,713,723 B2 | 7/2017 | Shemer et al. | |
| 10,207,110 B1* | 2/2019 | Gelfand | A61N 1/36114 |
| 2003/0036777 A1 | 2/2003 | Sheth et al. | |
| 2004/0127804 A1 | 7/2004 | Hatlesad et al. | |
| 2005/0039745 A1 | 2/2005 | Stahmann et al. | |
| 2005/0085867 A1 | 4/2005 | Tehrani et al. | |
| 2005/0090871 A1 | 4/2005 | Cho et al. | |
| 2006/0100668 A1 | 5/2006 | Ben-David et al. | |
| 2006/0224190 A1 | 10/2006 | Gill et al. | |
| 2007/0060962 A1 | 3/2007 | Papponc | |
| 2008/0021336 A1* | 1/2008 | Dobak | A61B 5/1102 |
| | | | 600/508 |
| 2008/0103532 A1 | 5/2008 | Armstrong | |
| 2008/0114411 A1 | 5/2008 | Lian et al. | |
| 2008/0275520 A1* | 11/2008 | Hopper | A61N 1/368 |
| | | | 607/17 |
| 2009/0030471 A1* | 1/2009 | Rousso | A61N 1/36514 |
| | | | 607/27 |
| 2009/0062882 A1 | 3/2009 | Zhang et al. | |
| 2009/0248101 A1 | 10/2009 | Anker | |
| 2009/0287103 A1 | 11/2009 | Pillai | |
| 2010/0069977 A1 | 3/2010 | Stahmann | |
| 2010/0069985 A1 | 3/2010 | Stahmann | |
| 2010/0087892 A1 | 4/2010 | Stubbs | |
| 2010/0248288 A1* | 9/2010 | Hess | G01N 33/74 |
| | | | 435/287.1 |
| 2010/0305647 A1 | 12/2010 | McCabe et al. | |
| 2011/0034812 A1* | 2/2011 | Patangay | A61N 1/36564 |
| | | | 607/23 |
| 2011/0152956 A1 | 6/2011 | Hincapie-Ordonez et al. | |
| 2013/0006319 A1 | 1/2013 | Doerr | |
| 2013/0138006 A1 | 5/2013 | Bornzin et al. | |
| 2013/0218222 A1 | 8/2013 | Doerr | |
| 2015/0051660 A1* | 2/2015 | Meyer | A61N 1/36585 |
| | | | 607/18 |
| 2016/0045732 A1 | 2/2016 | Grenz et al. | |
| 2017/0245794 A1 | 8/2017 | Sharma | |
| 2017/0348524 A1 | 12/2017 | Matos | |
| 2018/0110561 A1* | 4/2018 | Levin | A61N 1/00 |
| 2018/0214698 A1* | 8/2018 | Cuchiara | A61M 60/531 |
| 2019/0060632 A1 | 2/2019 | Asirvatham | |
| 2019/0329043 A1 | 10/2019 | Sharma | |
| 2019/0329052 A1* | 10/2019 | Kim | A61B 5/318 |
| 2022/0379120 A1 | 12/2022 | Prutchi et al. | |
| 2022/0387790 A1 | 12/2022 | Prutchi et al. | |
| 2022/0387795 A1 | 12/2022 | Prutchi et al. | |
| 2023/0173280 A1 | 6/2023 | Prutchi et al. | |

FOREIGN PATENT DOCUMENTS

| | | | |
|---|---|---|---|
| CN | 1882296 | 12/2006 | |
| CN | 101827629 | 9/2010 | |
| CN | 104321107 | 1/2015 | |
| CN | 107261324 | 10/2017 | |
| EP | 0334675 | 9/1989 | |
| EP | 0600631 | 6/1994 | |
| EP | 0910429 | 4/1999 | |
| EP | 2659931 | 11/2013 | |
| JP | 2007-503286 | 2/2007 | |
| JP | 2008-532630 | 8/2008 | |
| JP | 2010-104750 | 5/2010 | |
| JP | 2011-502552 | 1/2011 | |
| JP | 2012-502729 | 2/2012 | |
| JP | 2012-504468 | 2/2012 | |
| JP | 2015-503397 | 2/2015 | |
| WO | WO 2004/080533 | 9/2004 | |
| WO | WO 2010/039877 | 4/2010 | |
| WO | WO-2017218418 A1* | 12/2017 | A61K 45/06 |
| WO | WO 2021/079316 | 4/2021 | |
| WO | WO 2021/079318 | 4/2021 | |
| WO | WO 2021/079319 | 4/2021 | |
| WO | WO 2021/198755 | 10/2021 | |

OTHER PUBLICATIONS

Meluzin et al. (2016). Improvement in the prediction of exercise-induced elevation of left ventricular filling pressure in patients with normal left ventricular ejection fraction. Echocardiography, 34(1), 78-86. https://doi.org/10.1111/echo.13403 (Year: 2016).*
Eisman, A. S. et al. (2018). Pulmonary capillary wedge pressure patterns during exercise predict exercise capacity and incident heart failure. Circulation: Heart Failure, 11(5). (Year: 2018).*
Meluzin, J. et al. (2016). Improvement in the prediction of exercise-induced elevation of left ventricular filling pressure in patients with normal left ventricular ejection fraction. Echocardiography, 34(1), 78-86. (Year: 2016).*
Eisman, A. S. et al. (2018). Pulmonary capillary wedge pressure patterns during exercise predict exercise capacity and incident heart failure. (Year: 2018).*
Meluzin, J. et al. (2016). Improvement in the prediction of exercise-induced elevation of left ventricular filling pressure in patients with normal left ventricular ejection fraction. Echocardiography, 34 (Year: 2016).*
https://my.clevelandclinic.org/health/diseases/17116-hypertrophic-cardiomyopathy (Year: 2021).*
International Preliminary Report on Patentability Dated May 5, 2022 From the International Bureau of WIPO Re. Application No. PCT/IB2020/059943. (8 Pages).
International Preliminary Report on Patentability Dated May 5, 2022 From the International Bureau of WIPO Re. Application No. PCT/IB2020/059947. (10 Pages).
International Preliminary Report on Patentability Dated May 5, 2022 From the International Bureau of WIPO Re. Application No. PCT/IB2020/059949. (10 Pages).
International Preliminary Report on Patentability Dated Jul. 21, 2022 From the International Preliminary Examining Authority Re. Application No. PCT/IB2020/059944. (21 Pages).
International Scarch Report and the Written Opinion Dated Feb. 4, 2021 From the International Searching Authority Re. Application No. PCT/IB2020/059949. (14 Pages).
International Search Report and the Written Opinion Dated Aug. 12, 2021 From the International Searching Authority Re. Application No. PCT/IB2020/059947. (16 Pages).
International Search Report and the Written Opinion Dated Jan. 14, 2021 From the International Searching Authority Re. Application No. PCT/IB2020/059943. (17 Pages).
International Search Report and the Written Opinion Dated Aug. 20, 2021 From the International Searching Authority Re. Application No. PCT/IB2020/059944. (18 Pages).
Invitation to Pay Additional Fees, Communication Relating to the Result of the Partial International Search and the Provisional Opinion Dated Apr. 20, 2021 From the International Searching Authority Re. Application No. PCT/IB2020/059944. (9 Pages).
Invitation to Pay Additional Fees, Communication Relating to the Result of the Partial International Search and the Provisional Opinion Dated Apr. 26, 2021 From the International Searching Authority Re. Application No. PCT/IB2020/059947. (9 Pages).
Written Opinion Dated Mar. 15, 2022 From the International Searching Authority Re. Application No. PCT/IB2020/059944. (9 Pages).
Abi-Samra et al. "Cardiac Contractility Modulation: A Novel Approach for the Treatment of Heart Failure", Heart Fail Reviews 21:645-660, Jul. 9, 2016.

(56) References Cited

OTHER PUBLICATIONS

Abraham et al. "A Randomized Controlled Trial to Evaluate the Safety and Efficacy of Cardiac Contractility Modulation in Patients With Moderately Reduced Left Ventricular Ejection Fraction and A Narrow QRS Duration: Study Rationale and Design", Journal of Cardiac Failure, 21(1): 16-23, Jan. 2015.
Abraham et al. "A Randomized Controlled Trial to Evaluate the Safety and Efficacy of Cardiac Contractility Modulation", Journal of the American College of Cardiology, JACC: Heart Failure, 6(10): 874-883, Published Online May 10, 2018.
Abraham et al. "Subgroup Analysis of A Randomized Controlled Trial Evaluating the Safety and Efficacy of Cardiac Contractility Modulation in Advanced Heart Failure", Journal of Cardiac Failure, 17(9): 710-717, Published Online Jun. 22, 2011.
Anker et al. "Cardiac Contractility Modulation Improves Long-Term Survival and Hospitalizations in Heart Failure With Reduced Ejection Fraction", European Journal of Heart Failure, 21(9): 1103-1113, Published Online Jan. 16, 2019.
Borggrcfc ct al. "Randomizcd, Double Blind Study of Non-Excitatory, Cardiac Contractility Modulation Electrical Impulses for Symptomatic Heart Failure", European Heart Journal, 29(8): 1019-1028, Published Online Feb. 12, 2008.
Giallauria et al. "Effects of Cardiac Contractility Modulation by Non-Excitatory Electrical Simulation on Exercise Capacity and Quality of Life: An Individual Patient's Data Meta-Analysis of Randomized Controlled Trials", International Journal of Cardiology, XP028880522, 175(2): 352-357, Available Online Jun. 19, 2014.
Ibrahim et al. "Power Prior Distributions for Regression Models", Statistical Science, 15(1): 46-60, Feb. 2000.
Kadish et al. "A Randomized Controlled Trial Evaluating the Safety and Efficacy of Cardiac Contractility Modulation in Advanced Heart Failure", American Heart Journal, 161(2): 329-337, Feb. 2011.
Kuschyk et al. "Efficacy and Survival in Patients With Cardiac Contractility Modulation: Long-Term Single Center Experience in 81 Patients", International Journal of Cardiology, 183: 76-81, Available Online Jan. 20, 2015.
Liu et al. "Improvement of Long-Term Survival by Cardiac Contractility Modulation in Heart Failure Patients: A Case-Control Study", International Journal of Cardiology, 206: 122-126, Available On line Jan. 6, 2016.
Lyon et al. "Cardiac Contractility Modulation Therapy in Advanced Systolic Heart Failure", Nature Reviews Cardiology, XP0557621686, 10(10): 584-598, Advance Online Publication Aug. 13, 2013.
Mando et al. "Outcomes of Cardiac Contractility Modulation: A Systemic Review and Meta-Analysis of Randomized Clinical Trials", Cardiovascular Therapeutics, 2019(Art.ID 9769724): 1-10, Jun. 17, 2019.
Mueller et al. "Clinical Effects of Long-Term Cardiac Contractility Modulation (CCM) in Subjects With Heart Failure Caused by Left Ventricular Systolic Dysfunction", Clinical Research of Cardiology, 106(11): 893-904, Published Online Jul. 6, 2017.
Neelagaru et al. "Nonexcitatory, Cardiac Contractility Modulation Electrical Impulses: Feasibility Study for Advanced Heart Failure in Patients With Normal QRS Duration", Heart Rythm, 3(10): 1140-1147, Published Online Jul. 8, 2006.
Schoene et al. "Cardiac Contractility Modulation Provides Improved Ventilatory Efficiency and Reduces Oscillatory Breathing Pattern", European Heart Journal, Poster Session 4: Advanced Heart Failure, 40(Suppl.1): 2133: # P3523, Oct. 21, 2019.
Schuirmann "Pharmacometrics: A Comparison of the Two One-Sided Tests Procedure and the Power Approach for Assessing the Equivalence of Average Bioavailability", Journal of Pharmacokinetics and Biopharmaceutics, 15(6): 657-680, Dec. 1987.
Tint et al. "New Generation Cardiac Contractility Modulation Device—Filling the Gap in Heart Failure Treatment", Journal of Clinical Medicine, 8(5): 588-1-588-10, Apr. 29, 2019.
Tschoepe et al. "Cardiac Contractility Modulation: Mechanisms of Action in Heart Failure with Reduced Ejection Fraction and Beyond", European Journal of Heart Failure, 21(1):14-20, Nov. 28, 2018.
Uskach et al. "Possibilities and Perspectives of Using Cardiac Contractility Modulation in Patients With Chronic Heart Failure and Atrial Fibrillation", Kardiologiia, 59(2S): 4-14, 2019 & English Abstract.
Wang et al. "Meta-Analysis of the Incidence of Lead Dislodgement With Convcntional and Lcadlcss Paccmakcr Systcms", Pacing and Clinical Electrophysiology, PACE, 41(10): 1365-1371, Published Online Aug. 27, 2018.
Yu et al. "Impact of Cardiac Contractility Modulation on Left Ventricular Global and Regional Function and Remodeling", Journal of the American College of Cardiology, JACC: Cardiovascular Imaging, 2(12): 1341-1349, Dec. 2009.
Notice of Reason(s) for Rejection Dated Jun. 6, 2024 From the Japan Patent Office Re. Application No. 2022-523513 and Its Translation Into English. (12 Pages).
Notice of Reason(s) for Rejection Dated Jun. 11, 2024 From the Japan Patent Office Re. Application No. 2022-523998 and Its Translation Into English. (10 Pages).
Notice of Reason(s) for Rejection Dated May 28, 2024 From the Japan Patent Office Re. Application No. 2022-523514 and Its Translation Into English. (14 Pagcs).
El Shear "Novel Paradigms in the Therapeutic Management of I leart Failure With Preserved Ejection Fraction: Clinical Perspectives", American Journal of Cardiovascular Disease, 9(5): 91-108, Oct. 15, 2019.
Tschöpe et al. "Cardiac Contractility Modulation Signals Improve Exercise Intolerance and Maladaptive Regulation of Cardiac Key Proteins for Systolic and Diastolic Function in HFpEF", International Journal of Cardiology, 203: 1061-1066, Available Online Oct. 27, 2015.
Zile et al. "New Concepts in Diastolic Dysfunction and Diastolic Heart Failure: Part I. Diagnosis, Prognosis, and Measurements of Diastolic Function", Circulation, 105(11): 1387-1393, Mar. 19, 2002.
Zile et al. "New Concepts in Diastolic Dysfunction and Diastolic Heart Failure: Part II. Causal Mechanisms and Treatment", Circulation, 105(12): 1503-1508, Mar. 26, 2002.
Communication Pursuant to Article 94(3) EPC Dated Dec. 22, 2023 From the European Patent Office Re. Application No. 20801017.3 (4 Pages).
Official Action Dated Mar. 20, 2024 from the US Patent and Trademark Office Re. U.S. Appl. No. 17/770,329. (39 pages).
Notice of Reason(s) for Rejection Dated Mar. 4, 2025 From the Japan Patent Office Re. Application No. 2022-523514 and Its Translation Into English. (12 Pages).
Notice of Reason(s) for Rejection Dated Feb. 12, 2025 From the Japan Patent Office Re. Application No. 2022-523998 and Its Translation Into English. (9 Pages).
Official Action Dated Feb. 6, 2025 from the US Patent and Trademark Office Re. U.S. Appl. No. 17/911,676. (48 pages).
Restriction Official Action Dated Jan. 6, 2025 from the US Patent and Trademark Office Re. U.S. Appl. No. 17/770,707. (12 pages).
Restriction Official Action Dated Dec. 30, 2024 from the US Patent and Trademark Office Re. U.S. Appl. No. 17/770,318. (5 pages).
Oliver et al. "Anatomy, Thorax, Phrenic Nerves", Europe PMC, Search life-sciences literature, Study Guide from StatPearls Publishing, Treasure Island (FL), PMID: 30020697, Jul. 19, 2018. dowloaded from https://europepmc.org/article/nbk/nbk513325.
Notice of Reasons for Rejection Dated Dec. 3, 2024 From the Japan Patent Office Re. Application No. 2022-523513 and Its Translation into English. (12 Pages).
Official Action Dated Oct. 11, 2024 from the US Patent and Trademark Office Re. U.S. Appl. No. 17/770,329. (26 pages).
Additional Search Fees Due under Rule 164(2)(a) EPC Dated Feb. 26, 2025 From the European Patent Office Re. Application No. 20803263.1 (5 pages).
Interview Summary Dated Mar. 21, 2025 from the US Patent and Trademark Office Re. U.S. Appl. No. 17/770,329. (8 pages).
Notification of Office Action and Search Report Dated Apr. 1, 2025 From the State Intellectual Property Office of the People's Republic of China Re. Application No. 202080089348.6 and Its Machine Translation of Office Action into English. (10 Pages).

(56) References Cited

OTHER PUBLICATIONS

Notification of Office Action and Search Report Dated Mar. 19, 2025 From the State Intellectual Property Office of the People's Republic of China Re. Application No. 202080088570.4 and its Translation of the Office Action into English. (30 Pages).

Notification of Office Action and Search report Dated Mar. 21, 2025 From the State Intellectual Property Office of the People's Republic of China Re. Application No. 202080090192.3 and Its Translation in English (18 Pages).

Notification of Office Action and Search Report Dated Mar. 26, 2025 From the State Intellectual Property Office of the People's Republic of China Re. Application No. 202080101268.8 and Its Machine Translation of Office Action into English. (26 Pages).

* cited by examiner

Regular bipolar active fixation electrode (screw length up to 2mm)

Bipolar active fixation electrode with long screw (screw length can be between 2-30 mm)

MEANS AND METHODS FOR USING NON-EXCITATORY ELECTRICAL HEART FAILURE THERAPY AS A THERAPY FOR HEART FAILURE WITH PRESERVED EJECTION FRACTION

RELATED APPLICATION

This application claims the benefit of priority of U.S. Provisional Patent Application No. 63/217,813 filed on Jul. 2, 2021, the contents of which are incorporated herein by reference in their entirety.

FIELD AND BACKGROUND OF THE INVENTION

The present invention, in some embodiments thereof, relates to non-excitatory electrical heart failure therapy as a therapy for Heart failure with preserved ejection fraction (HFpEF).

Heart failure with preserved ejection fraction (HFpEF) is a pathology related to decreasing of cardiac output and elevating of the ventricular filling pressure.

HFpEF is typically driven by a systemic disease, involving cumulative risk factors. Unlike heart failure with reduced ejection fraction (HFrEF), normally starts from the heart and have clinical impact on the periphery, HFpEF typically starts peripherally and ends with cardiac dysfunction.

SUMMARY OF THE INVENTION

Following is a non-exclusive list including some examples of embodiments of the invention. The invention also includes embodiments which include fewer than all the features in an example and embodiments using features from multiple examples, also if not expressly listed below.

Example 1. A method of treating a patient with non-excitatory electrical heart failure therapy, the method comprising:
  a. identifying a patient that suffers of heart failure (HF) and presents pulmonary capillary wedge pressure indexed to cardiac output (PCWP/CO) slope greater than 2 mm Hg/L/min;
  b. providing an effective amount of non-excitatory electrical heart failure therapy.

Example 2. The method according to example 1, wherein said non-excitatory electrical heart failure therapy is cardiac contractility modulation therapy.

Example 3. The method according to example 1 or example 2, wherein said providing an effective amount of non-excitatory electrical heart failure therapy comprises providing until said HF patient presents a reduction in said PCWP/CO slope or an increase in an average stroke volume.

Example 4. The method according to any one of examples 1-3, wherein said providing non-excitatory electrical heart failure therapy is provided until said HF patient presents an increase in cardiac contractility.

Example 5. The method according to any one of examples 1-4, wherein said providing non-excitatory electrical heart failure therapy is provided until said HF patient presents an increase in cardiac output.

Example 6. The method according to any one of examples 1-5, wherein said providing non-excitatory electrical heart failure therapy is provided until said HF patient presents a reduction in arrhythmia level.

Example 7. The method according to any one of examples 1-6, wherein said providing non-excitatory electrical heart failure therapy is provided until said HF patient presents a reduction in cardiac stiffness.

Example 8. The method according to any one of examples 1-7, wherein the HF condition is HF with preserved ejection fraction (pEF).

Example 9. A method of treating a patient with non-excitatory electrical heart failure therapy, the method comprising:
  a. identifying a patient that suffers of heart failure (HF) and presents left ventricle ejection fraction (LVEF) greater than 45% and an exercise-induced diastolic dysfunction having wedge pressure greater than 25 mmHg;
  b. providing an effective amount of non-excitatory electrical heart failure therapy.

Example 10. The method according to example 9, wherein said non-excitatory electrical heart failure therapy is cardiac contractility modulation therapy.

Example 11. The method according to example 9 or example 10, wherein said providing an effective amount of non-excitatory electrical heart failure therapy comprises providing until said HF patient presents a reduction in said wedge pressure or an increase in an average stroke volume.

Example 12. The method according to any one of examples 9-11, wherein said providing non-excitatory electrical heart failure therapy is provided until said HF patient presents an increase in cardiac contractility.

Example 13. The method according to any one of examples 9-12, wherein said providing non-excitatory electrical heart failure therapy is provided until said HF patient presents an increase in cardiac output.

Example 14. The method according to any one of examples 9-13, wherein said providing non-excitatory electrical heart failure therapy is provided until said HF patient presents a reduction in arrhythmia level.

Example 15. The method according to any one of examples 9-14, wherein said providing non-excitatory electrical heart failure therapy is provided until said HF patient presents a reduction in cardiac stiffness.

Example 16. The method according to any one of examples 9-15, wherein the HF condition is HF with preserved ejection fraction (pEF).

Example 17. A method of treating a patient with non-excitatory electrical heart failure therapy, the method comprising:
  a. identifying a patient that suffers of heart failure (HF) and presents right ventricular (RV) dysfunction;
  b. assessing if said HF patient presents one or more of the following conditions:
    i. Pulmonary hypertension;
    ii. Right ventricular ejection fraction (RVEF) lower than 50%;
    iii. Hypertrophic RV having RVEF greater than 50%; and
    iv. LV is preserved with ejection fraction (EF)>50%;
  c. providing an effective amount of non-excitatory electrical heart failure therapy.

Example 18. The method according to example 17, wherein said non-excitatory electrical heart failure therapy is cardiac contractility modulation therapy.

Example 19. The method according to example 17 or example 18, wherein said providing an effective amount of non-excitatory electrical heart failure therapy comprises providing until said HF patient presents an improvement in said RV dysfunction or an increase in an average stroke volume.

Example 20. The method according to any one of examples 17-19, wherein said providing non-excitatory electrical heart failure therapy is provided until said HF patient presents an increase in cardiac contractility.

Example 21. The method according to any one of examples 17-20, wherein said providing non-excitatory electrical heart failure therapy is provided until said HF patient presents an increase in cardiac output.

Example 22. The method according to any one of examples 17-21, wherein said providing non-excitatory electrical heart failure therapy is provided until said HF patient presents a reduction in arrhythmia level.

Example 23. The method according to any one of examples 17-22, wherein said providing non-excitatory electrical heart failure therapy is provided until said HF patient presents a reduction in cardiac stiffness.

Example 24. The method according to any one of examples 17-23, wherein the HF condition is HF with preserved ejection fraction (pEF).

Example 25. A method of treating a patient with non-excitatory electrical heart failure therapy, the method comprising:
 a. identifying a patient that suffers of heart failure (HF) and presents LVEF greater than 50% and enlarged left atria and atrial fibrillation;
 b. providing an effective amount of non-excitatory electrical heart failure therapy.

Example 26. The method according to example 25, wherein said non-excitatory electrical heart failure therapy is cardiac contractility modulation therapy.

Example 27. The method according to example 25 or example 26, wherein said providing an effective amount of non-excitatory electrical heart failure therapy comprises providing until said HF patient presents a an improvement in said HF condition or an increase in an average stroke volume.

Example 28. The method according to any one of examples 25-27, wherein said providing non-excitatory electrical heart failure therapy is provided until said HF patient presents an increase in cardiac contractility.

Example 29. The method according to any one of examples 25-28, wherein said providing non-excitatory electrical heart failure therapy is provided until said HF patient presents an increase in cardiac output.

Example 30. The method according to any one of examples 25-29, wherein said providing non-excitatory electrical heart failure therapy is provided until said HF patient presents a reduction in arrhythmia level.

Example 31. The method according to any one of examples 25-30, wherein said providing non-excitatory electrical heart failure therapy is provided until said HF patient presents a reduction in cardiac stiffness.

Example 32. The method according to any one of examples 25-31, wherein the HF condition is HF with preserved ejection fraction (pEF).

Example 33. A method of treating a patient with non-excitatory electrical heart failure therapy, the method comprising:
 a. identifying a patient that suffers of heart failure (HF) and presents LVEF greater than 50% without cardiac amyloidosis;
 b. providing an effective amount of non-excitatory electrical heart failure therapy.

Example 34. The method according to example 33, wherein said non-excitatory electrical heart failure therapy is cardiac contractility modulation therapy.

Example 35. The method according to example 33 or example 34, wherein said providing an effective amount of non-excitatory electrical heart failure therapy comprises providing until said HF patient presents an improvement in said HF condition or an increase in an average stroke volume.

Example 36. The method according to any one of examples 33-35, wherein said providing non-excitatory electrical heart failure therapy is provided until said HF patient presents an increase in cardiac contractility.

Example 37. The method according to any one of examples 33-36, wherein said providing non-excitatory electrical heart failure therapy is provided until said HF patient presents an increase in cardiac output.

Example 38. The method according to any one of examples 33-37, wherein said providing non-excitatory electrical heart failure therapy is provided until said HF patient presents a reduction in arrhythmia level.

Example 39. The method according to any one of examples 33-38, wherein said providing non-excitatory electrical heart failure therapy is provided until said HF patient presents a reduction in cardiac stiffness.

Example 40. The method according to any one of examples 33-39, wherein the HF condition is HF with preserved ejection fraction (pEF).

Example 41. A method of treating a patient with non-excitatory electrical heart failure therapy, the method comprising:
 a. identifying a patient that suffers of heart failure (HF) and presents a preserved ejection fraction (pEF);
 b. assessing existence of cardiac stiffness in said HF patient using E/E' ratio;
 c. providing an effective amount of non-excitatory electrical heart failure therapy.

Example 42. The method according to example 41, wherein said non-excitatory electrical heart failure therapy is cardiac contractility modulation therapy.

Example 43. The method according to example 41 or example 42, wherein said providing an effective amount of non-excitatory electrical heart failure therapy comprises providing until said HF patient presents one or more of:
 i. a reduction in Tintin aggregation;
 ii. an increase in phosphorylation level in a cardiac tissue;
 iii. a reduction in cardiac collagen and fibroblasts levels in a cardiac tissue.

Example 44. The method according to any one of examples 41-43, wherein said providing non-excitatory electrical heart failure therapy is provided until said HF patient presents an increase in cardiac contractility.

Example 45. The method according to any one of examples 41-44, wherein said providing non-excitatory electrical heart failure therapy is provided until said HF patient presents an increase in cardiac output.

Example 46. The method according to any one of examples 41-45, wherein said providing non-excitatory electrical heart failure therapy is provided until said HF patient presents a reduction in arrhythmia level.

Example 47. The method according to any one of examples 41-46, wherein said providing non-excitatory electrical heart failure therapy is provided until said HF patient presents a reduction in cardiac stiffness.

Example 48. A method of treating a patient with non-excitatory electrical heart failure therapy, the method comprising:
 a. identifying a patient that suffers of heart failure (HF) and presents a preserved ejection fraction (pEF);

b. assessing if said HF patient presents either a low heart rate variability or a heart rate variability lower than a predetermined threshold;

c. providing an effective amount of non-excitatory electrical heart failure therapy.

Example 49. The method according to example 48, wherein said non-excitatory electrical heart failure therapy is cardiac contractility modulation therapy.

Example 50. The method according to example 48 or example 49, wherein said providing an effective amount of non-excitatory electrical heart failure therapy comprises providing until said HF patient presents an increment in parasympathetic tone.

Example 51. The method according to any one of examples 49-50, wherein said providing non-excitatory electrical heart failure therapy is provided until said HF patient presents an increase in cardiac contractility.

Example 52. The method according to any one of examples 49-51, wherein said providing non-excitatory electrical heart failure therapy is provided until said HF patient presents an increase in cardiac output.

Example 53. The method according to any one of examples 49-52, wherein said providing non-excitatory electrical heart failure therapy is provided until said HF patient presents a reduction in arrhythmia level.

Example 54. The method according to any one of examples 49-53, wherein said providing non-excitatory electrical heart failure therapy is provided until said HF patient presents a reduction in cardiac stiffness.

Example 55. An implant cardiac electrode lead comprising fixation mechanism for anchoring said implantable cardiac electrode lead to at least a part of a heart; wherein said fixation mechanism comprises a long screw having a length of from about more than 2 mm to about 30 mm.

Example 56. The implantable cardiac electrode lead according to example 55, wherein said fixation mechanism comprises a long screw having a length of more than 5 mm.

Example 57. The implantable cardiac electrode lead according to example 55 or example 56, wherein said fixation mechanism comprises a long screw having a length of more than 10 mm.

Example 58. The implantable cardiac electrode lead according to any one of examples 55-57, wherein said implantable cardiac electrode lead is a bipolar implantable cardiac electrode lead.

Example 59. The implantable cardiac electrode lead according to any one of examples 55-58, wherein one first pole of said bipolar implantable cardiac electrode lead is on a part of a body of said implantable cardiac electrode lead and one second pole is on a distal end of said implantable cardiac electrode lead.

Example 60. The implantable cardiac electrode lead according to any one of examples 55-59, wherein both poles of said bipolar implantable cardiac electrode lead are located on said distal end.

Example 61. The implantable cardiac electrode lead according to any one of examples 55-60, wherein said body comprises a flexible insulating cylinder with at least one lumen.

Example 62. The implantable cardiac electrode lead according to any one of examples 55-61, wherein said implantable cardiac electrode lead is configured to be attached to a hypertrophic cardiac tissue.

Example 63. A method of selecting and treating a patient with a long screw electrode implantation, comprising:
a. identifying a patient presenting a ventricle septum hypertrophy;
b. placing said long screw electrode in a location on a right ventricle wall;
c. placing a distal end of said long screw electrode inside said wall more than 2 mm depth.

Example 64. The method according to example 63, further comprising delivering non-excitatory electrical heart failure therapy to said patient.

Example 65. A method of selecting and treating a patient with a long screw electrode implantation, comprising:
a. identifying a patient presenting heart failure;
b. placing said long screw electrode in a location on a right ventricle wall;
c. inserting a distal end of said long screw electrode inside said wall until said distal end enters a left ventricle.

Example 66. The method according to example 65, further comprising delivering non-excitatory electrical heart failure therapy to said patient using the screw electrode.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Figure 6A:
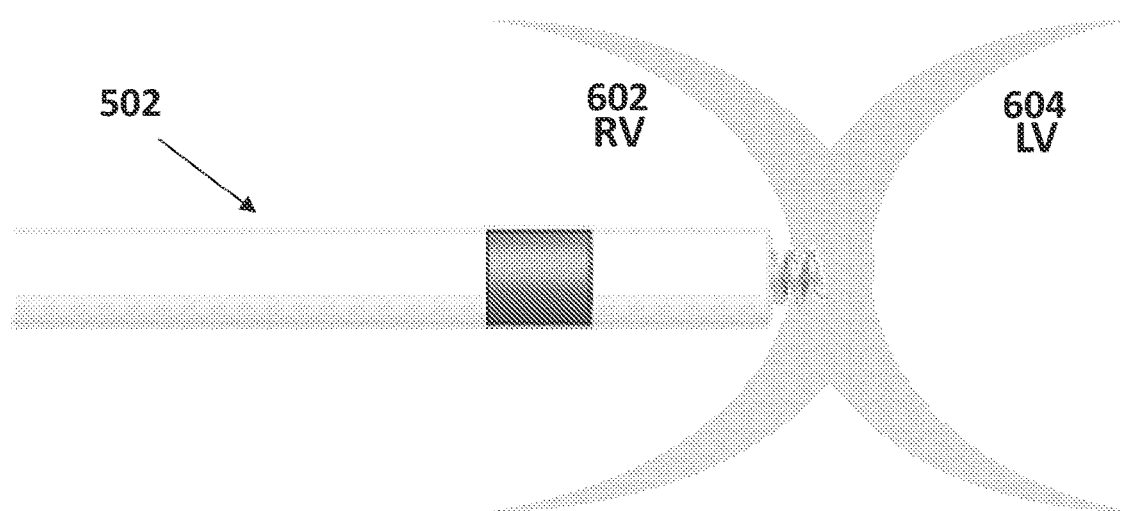
Figure 6B:
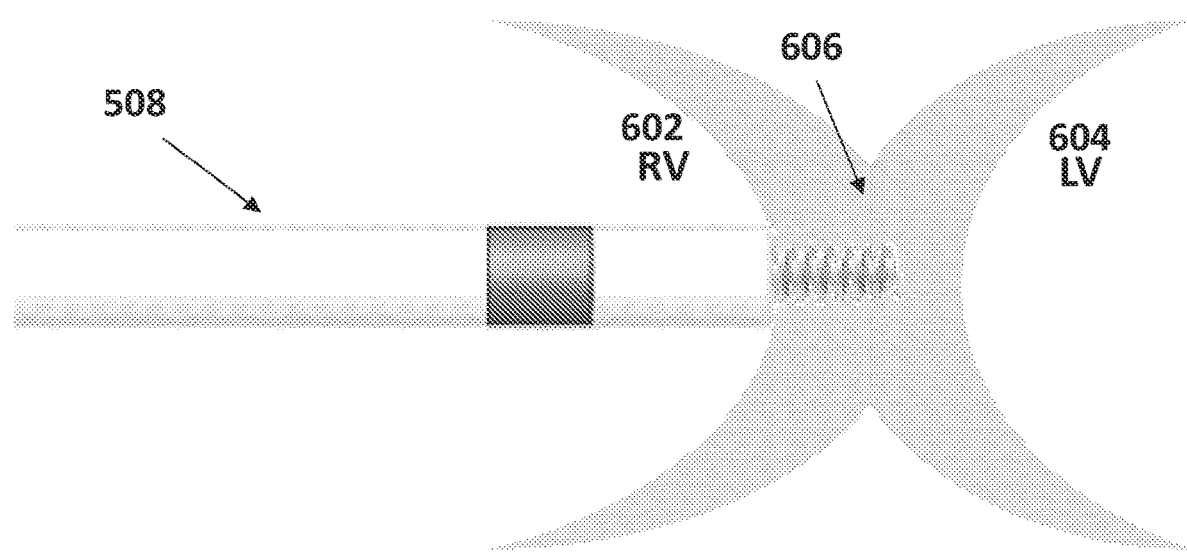
Figure 6C:
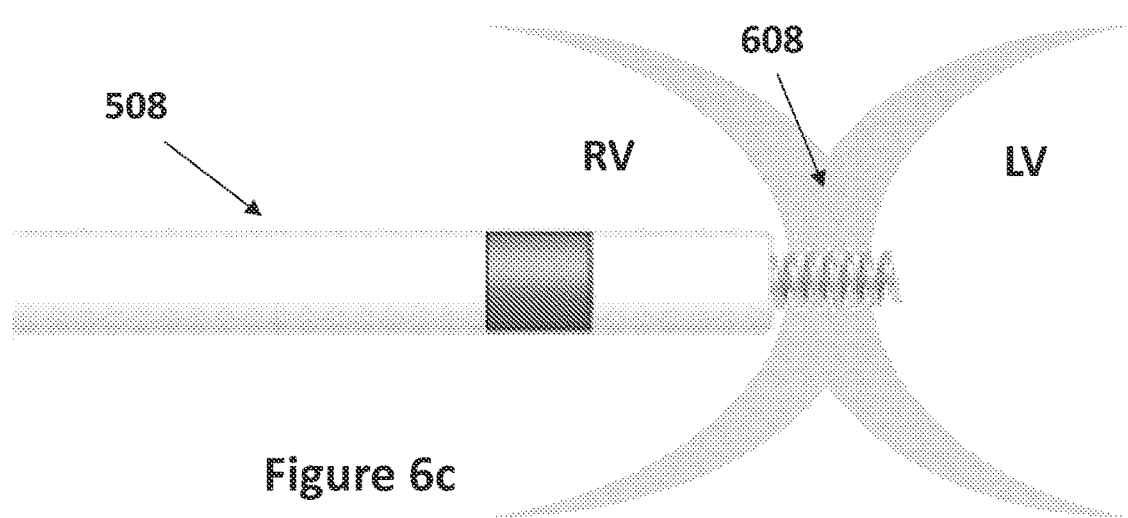
Figure 7:
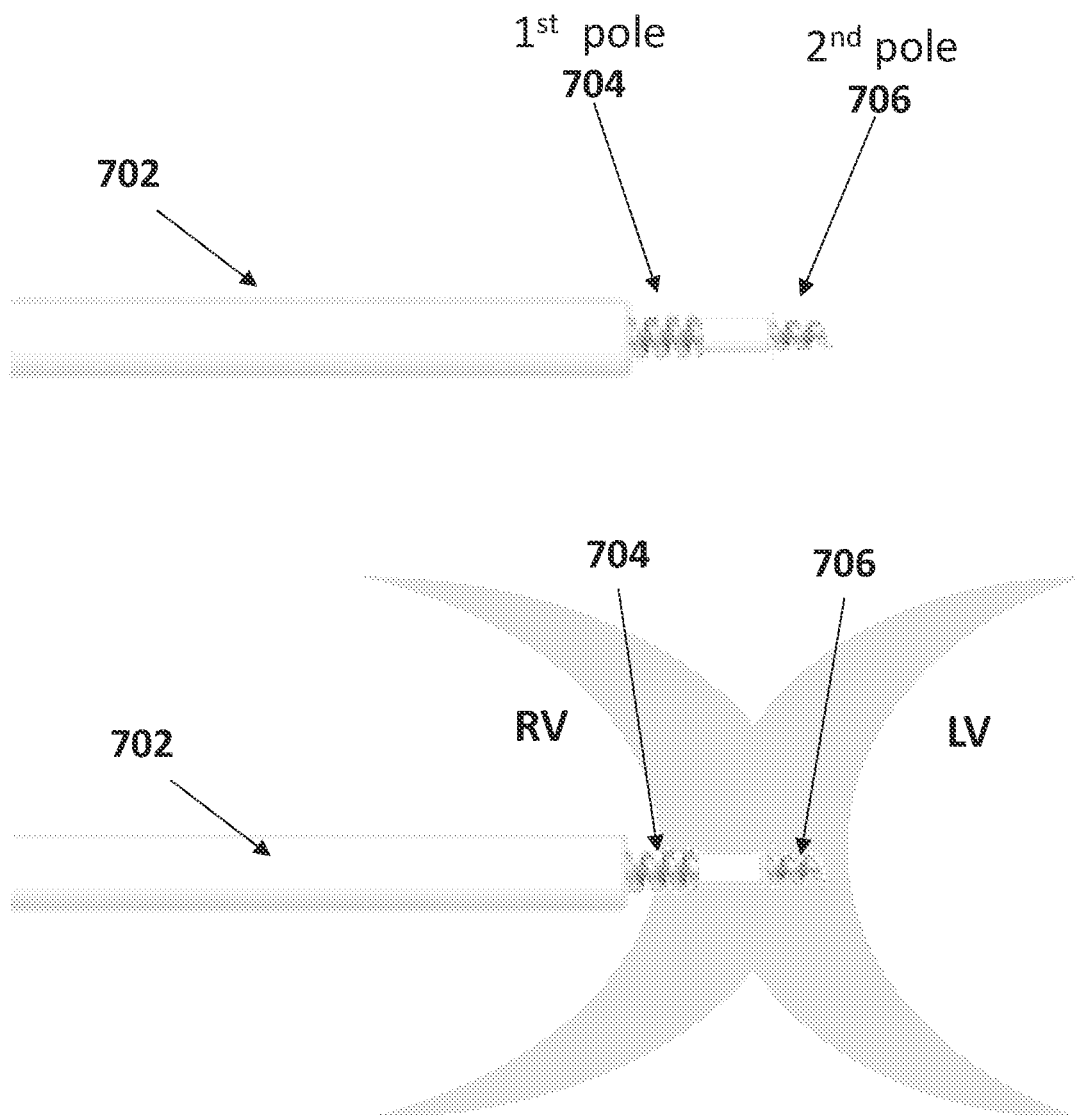
Figure 8:
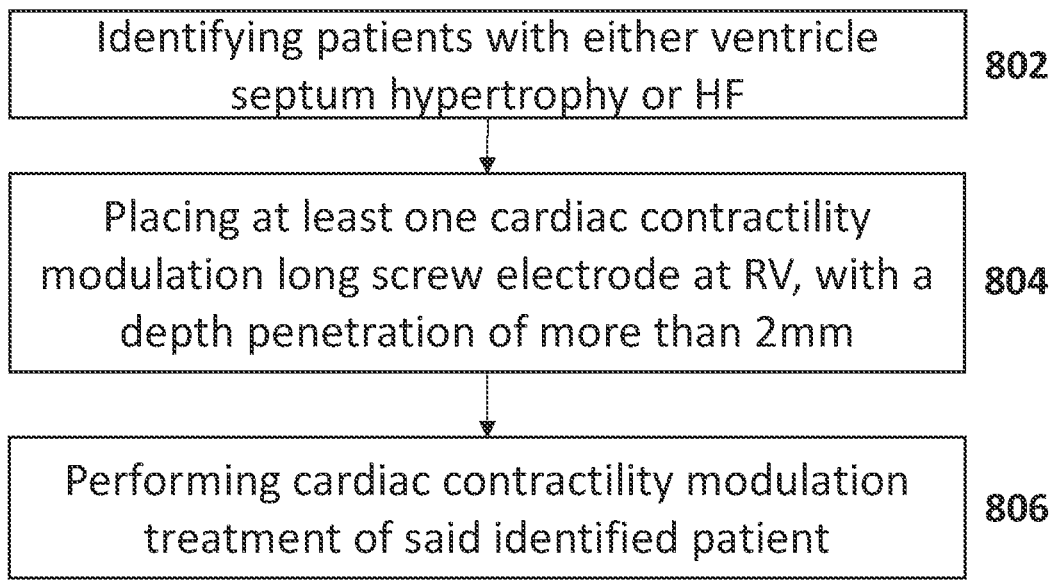

FIGS. 6a-c are schematic representations of connected prior art screw electrode and long screw electrodes to the heart's tissue, according to some embodiments of the invention;

FIG. 7 is a schematic representation of a variation of a long screw electrode, according to some embodiments of the invention;

FIG. 8 is a flowchart of an exemplary method of selection of patients in need for a long screw electrode and providing treatment thereof, according to some embodiments of the invention.

Figure 9:
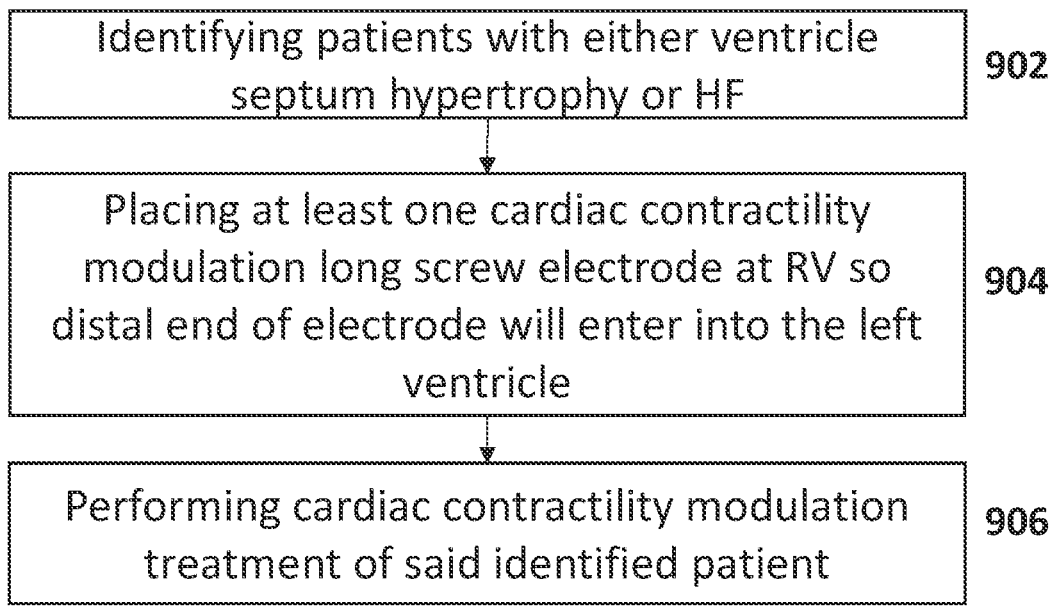
Figure 10:
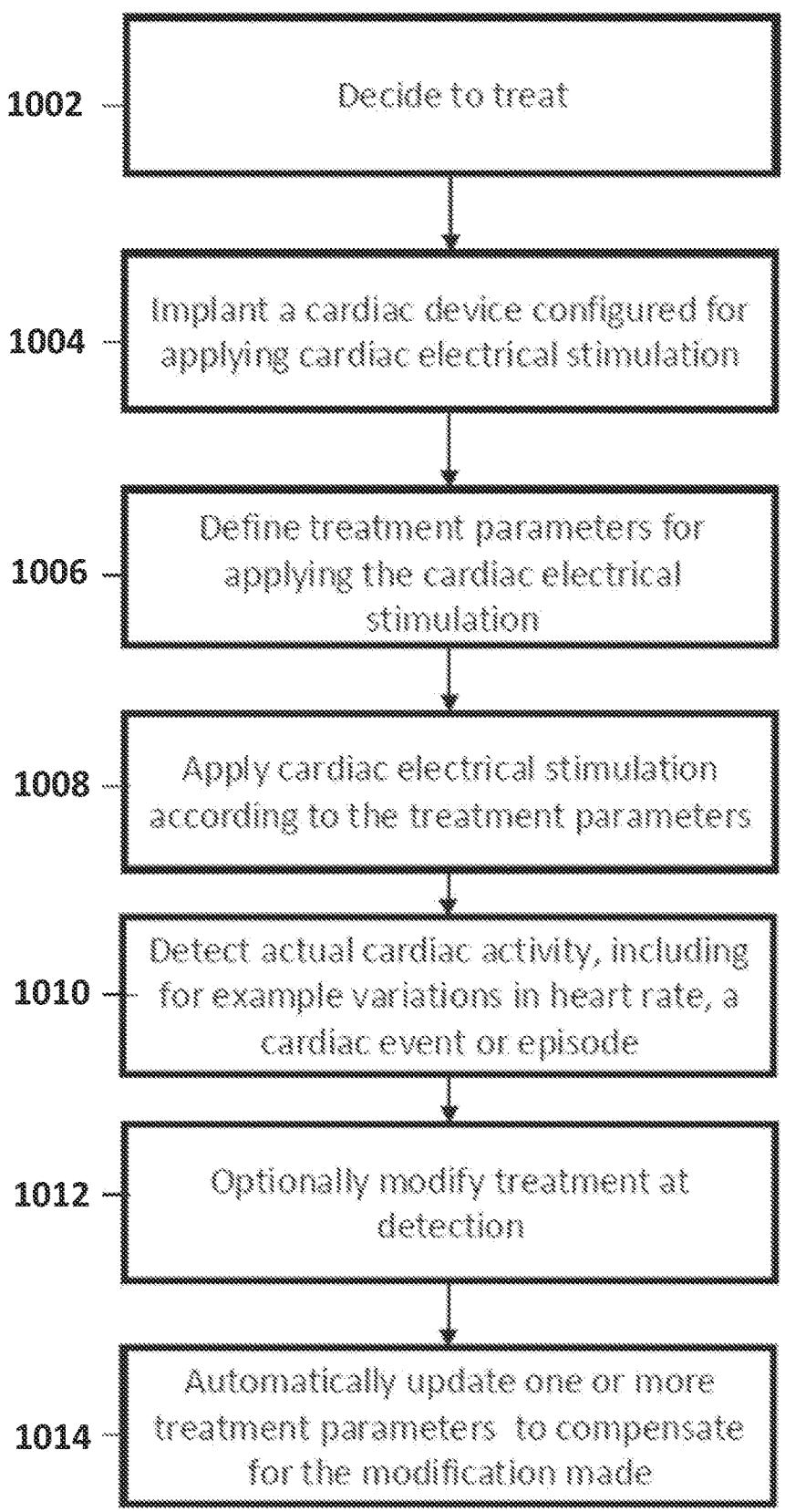
Figure 11:
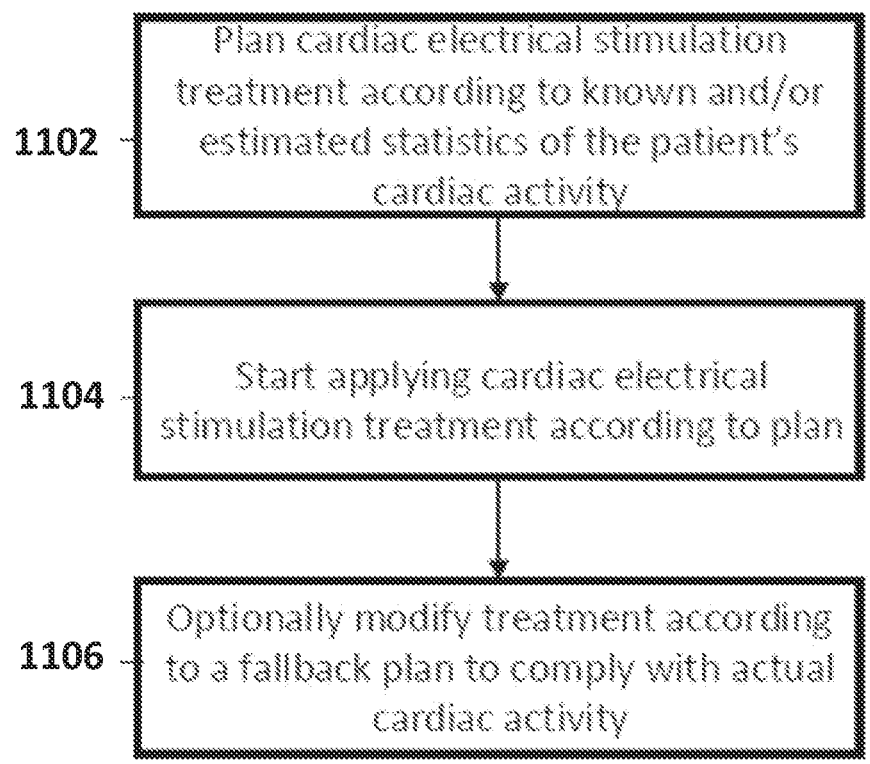
Figure 12A:
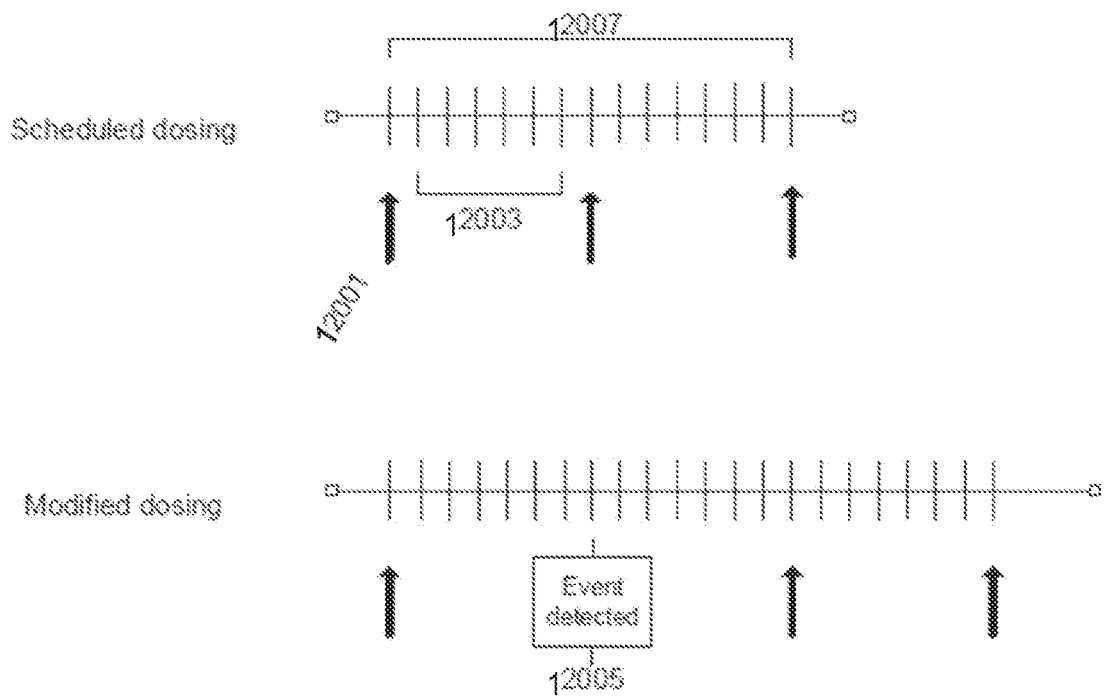
Figure 12B:
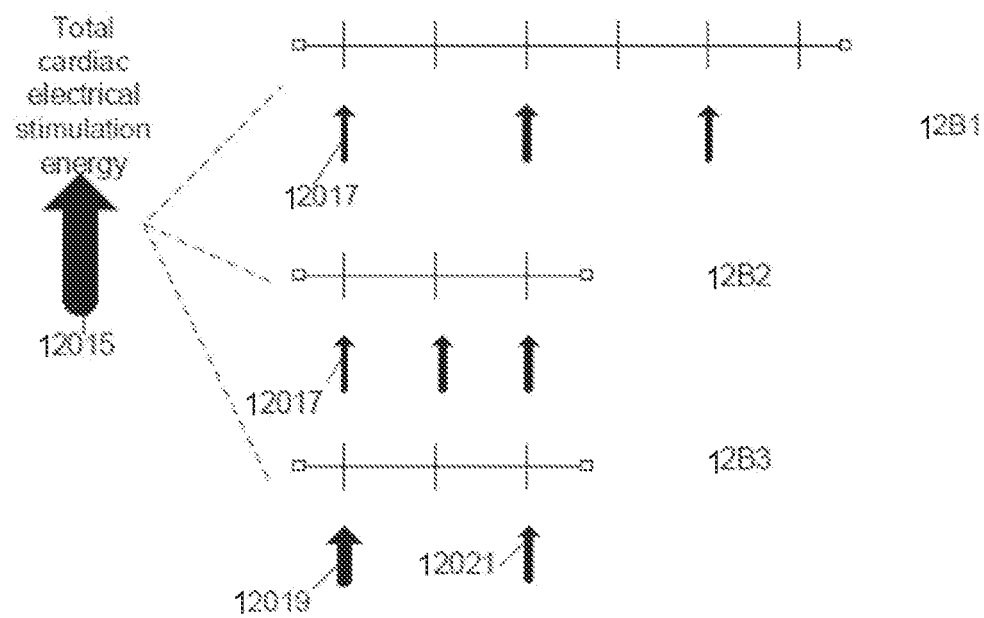
Figure 13:
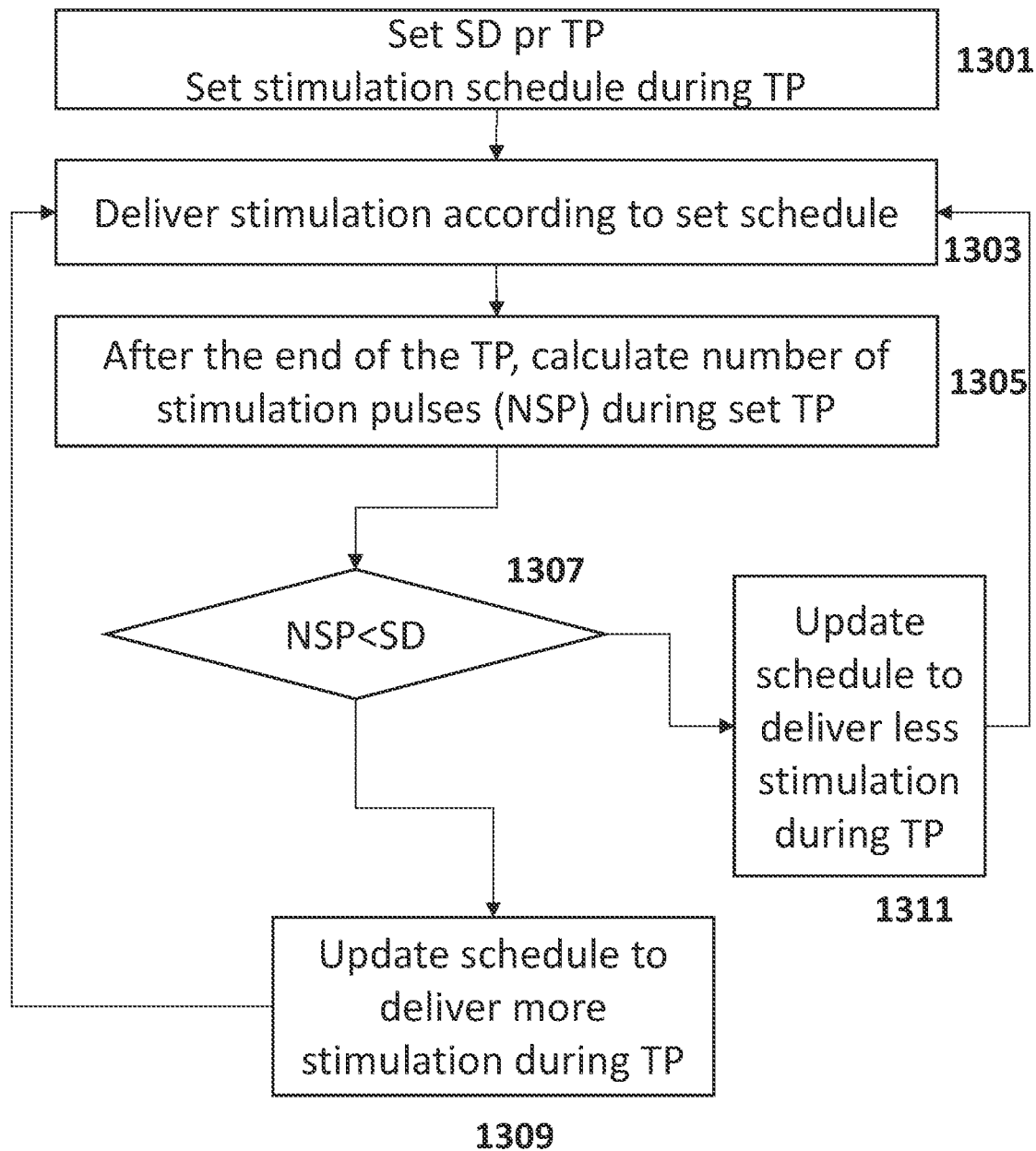
Figure 14A:
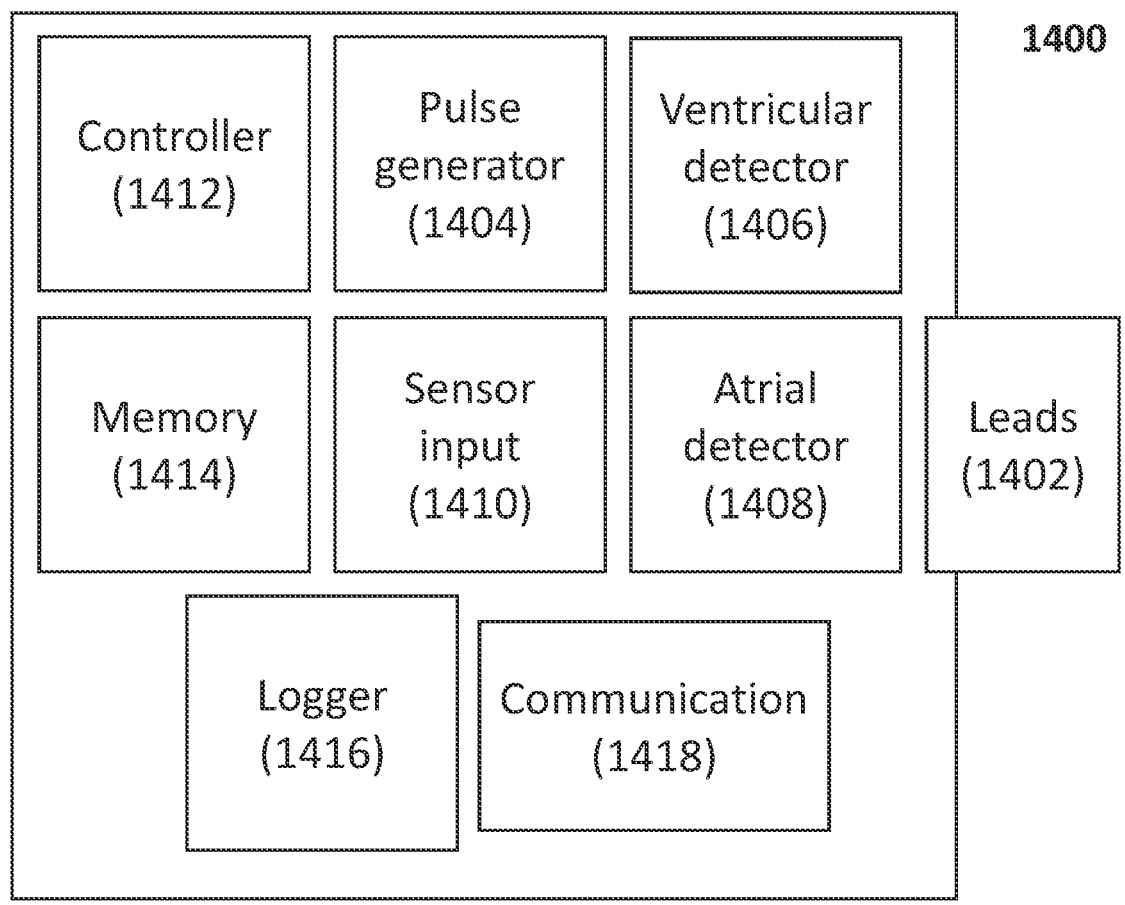
Figure 14B:
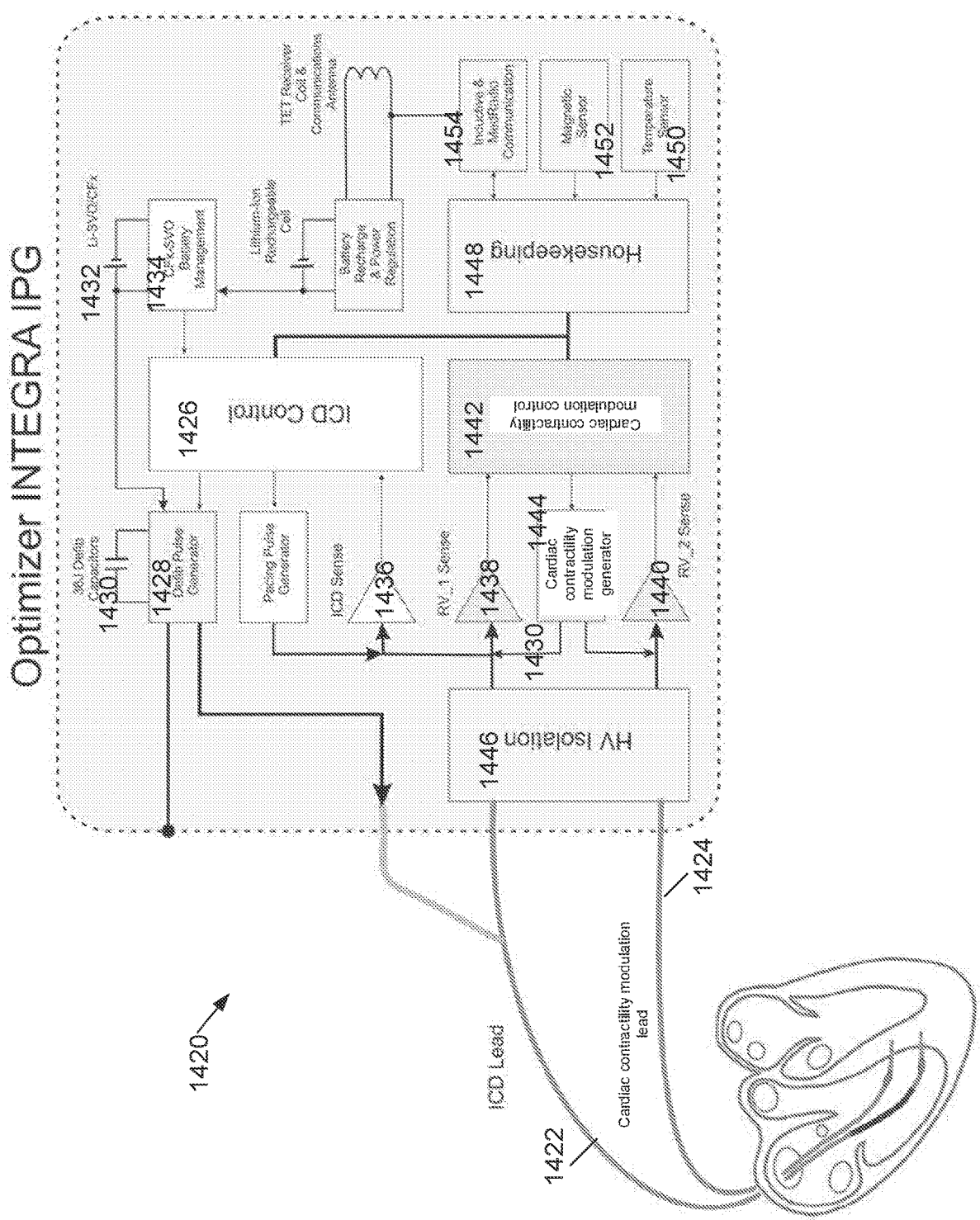
Figure 15A:
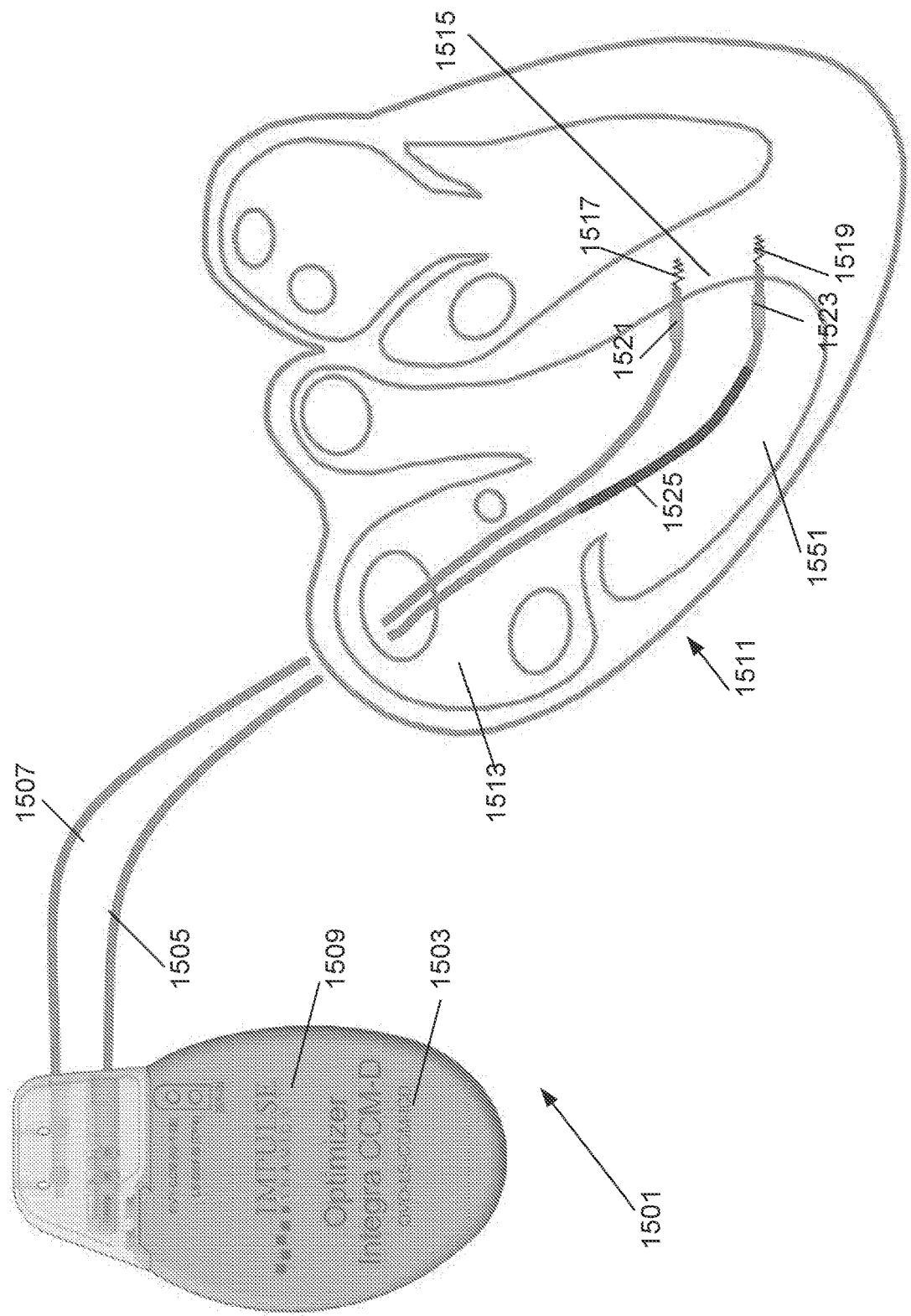
Figure 15B:
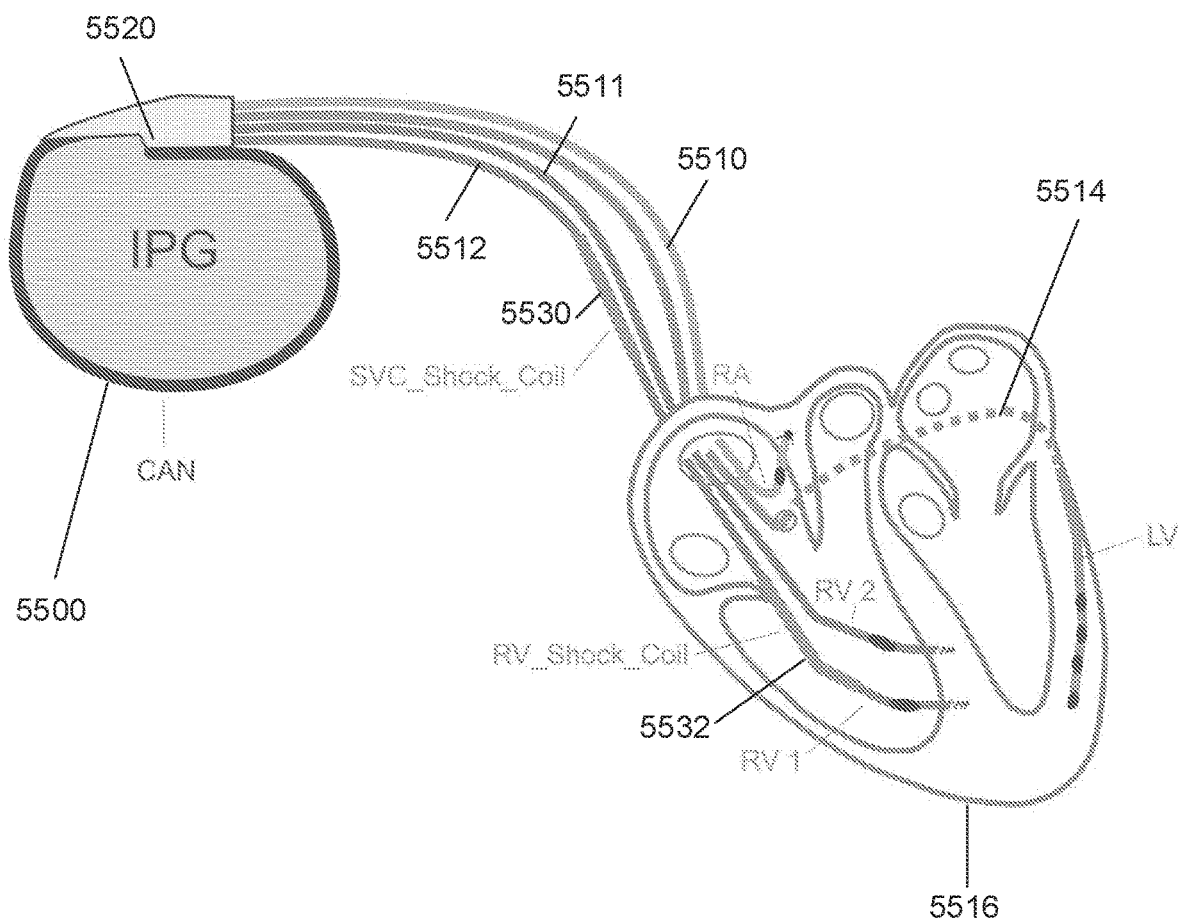

FIG. 9 is a flowchart of a method for cardiac electrical stimulation treatment in which real time changes in scheduled treatment are compensated for, according to some embodiments of the invention;

FIG. 10 is a flowchart of a method for planning cardiac electrical stimulation treatment and optionally modifying treatment in accordance with actual cardiac activity, according to some embodiments of the invention;

FIG. 11 schematically shows scheduled cardiac electrical stimulation dosing and modified cardiac electrical stimulation dosing which compensates for changes in the scheduled dosing due to actual cardiac activity, according to some embodiments of the invention;

FIGS. 12*a-b* schematically shows optional cardiac electrical stimulation treatments set in accordance with a total amount of stimulation energy to be delivered, according to some embodiments of the invention;

FIG. 13 is a flowchart of a method for setting and/or modifying cardiac electrical stimulation treatment dosing, according to some embodiments of the invention;

FIGS. 14*a-b* are block diagrams of exemplary systems for cardiac electrical stimulation treatment, according to some embodiments of the invention; and FIGS. 15*a-b* schematically illustrate exemplary implantable cardiac devices for cardiac electrical stimulation treatment, according to some embodiments of the invention.

DESCRIPTION OF SPECIFIC EMBODIMENTS OF THE INVENTION

The present invention, in some embodiments thereof, relates to non-excitatory electrical heart failure therapy as a therapy for Heart Failure where the patient presents a preserved Ejection Fraction (HFpEF).

Overview

An aspect of some embodiments of the invention relates to treatments for patients that suffer of heart failure and present a preserved ejection fraction (HFpEF) by using non-excitatory electrical heart failure therapy. In some embodiments, patients suffering of HFpEF are identified. In some embodiments, non-excitatory electrical heart failure therapy is performed on these patients. In some embodiments, performing non-excitatory electrical heart failure therapy in HFpEF patients potentially reduces cardiac muscle stiffness. In some embodiments, cardiac stiffness is measured E/E' ratio. In some embodiments, performing non-excitatory electrical heart failure therapy in HFpEF patients potentially reduces Titin aggregation, potentially increases phosphorylation level and potentially reduces cardiac collagen and fibroblasts levels. In some embodiments, non-excitatory electrical heart failure therapy in HFpEF patients potentially increases parasympathetic tone by providing non-excitatory electrical heart failure therapy for HFpEF patients with low heart rate variability (HRV) and/or by providing non-excitatory electrical heart failure therapy for HFpEF patients when their heart rate variability (HRV) is lower than set threshold.

An aspect of some embodiments of the invention relates to selection methods for identification of specific HFpEF patients that are suitable for treatment with non-excitatory electrical heart failure therapy. In some embodiments, identification of specific patients includes identifying a patient having one or more of the following medical conditions:

1) HF patient having Pulmonary Capillary Wedge Pressure (PCWP)/CO slope greater than 2 mm Hg/L/min;
2) HF patient having LV EF greater than 50% and exercise-induced diastolic dysfunction (having Wedge Pressure greater than 25 mmHg);
3) HF patient with RV dysfunction, having one or more of the following conditions: a) Having pulmonary hypertension; b) RV EF lower than 50%, 40%, 30%; c) Hypertrophic RV having RV EF greater than 50%; d) LV is preserved, EF>50%;
4) HF patient having LV EF greater than 50% and enlarged left atria, having one or more of the following conditions: a) With sinus rhythm; b) With atrial fibrillation;
5) HF patient having LV EF greater than 50% without cardiac amyloidosis.

In some embodiments, after identification of specific patients, treatment with non-excitatory electrical heart failure therapy can potentially improve one or more physiological parameters, as following: increasing cardiac contractility, increasing cardiac output, reduction in arrhythmia level and reduction in cardiac muscle stiffness.

An aspect of some embodiments of the invention relates to providing alternative locations for electrode placements in the heart of patients. In some embodiments, alternative locations for placement of electrodes are provided for patients RV hypertrophy or RV free wall dysfunction. In some embodiments, at least one cardiac contractility modulation electrode is placed at the RV free wall for delivering cardiac contractility modulation stimulation. In some embodiments, cardiac contractility modulation is potentially expected to prevent deterioration from RV hypertrophy into ventricle dilation.

An aspect of some embodiments of the invention relates to long-screw electrode configurations for delivering cardiac contractility modulation stimulation/non-excitatory electrical heart failure therapy. In some embodiments, long-screw electrodes are used in patients having ventricle septum hypertrophy. In some embodiments, long-screw electrodes are placed in the RV. In some embodiments, the electrode tip is placed deeper in the ventricle septum. In some embodiments, the tip depth penetration is higher than 2 mm. In some embodiments, once the long-screw electrode is placed, cardiac contractility modulation therapy/non-excitatory electrical heart failure therapy is delivered. In some embodiments, the long-screw electrode is screwed in the heart wall on the RV until the distal end will inter into the LV.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 1:
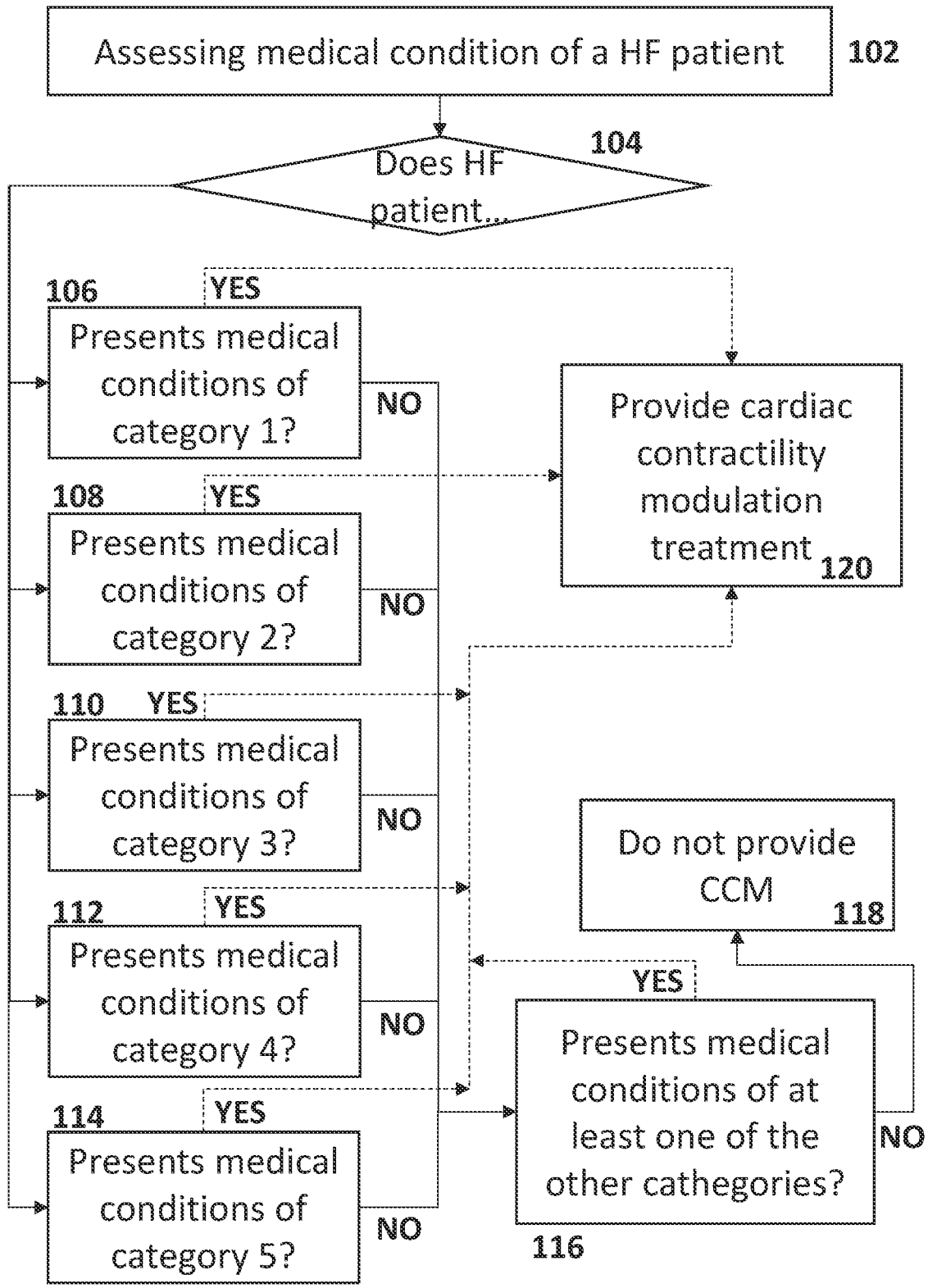
FIG. 1 is a showing a flowchart of an exemplary method of selecting a patient for non-excitatory electrical heart failure therapy, according to some embodiments of the invention.

Referring now to FIG. 1, showing a flowchart of an exemplary method of selecting a patient for cardiac contractility modulation treatment/non-excitatory electrical heart failure therapy, according to some embodiments of the invention. In the following paragraphs, the terms "cardiac modulation treatment" and "non-excitatory electrical heart failure therapy" are used. In some embodiments, those terms are interchangeable.

In some embodiments, the medical personnel will assess the medical conditions presented in a HF patient (meaning a patient that suffers of heart failure) presenting a preserved ejection fraction (HFpEF) 102.

In some embodiments, the difference between HFpEF and heart failure with reduced ejection fraction (HFrEF) is that, while both are HF conditions, they present different ranges of EF. In some embodiments, typical values of pEF are 40-55%, while rEF typical values are below 40%. In some embodiments, HFpEF is preceded by chronic comorbidities, such as hypertension, type 2 diabetes mellitus, obesity, and renal insufficiency, whereas HFrEF is often preceded by the acute or chronic loss of cardiomyocytes due to ischemia, a genetic mutation, myocarditis, or valvular disease.

In some embodiments, medical conditions can be divided in groups to facilitate the identification of relevant patients during the selection process for non-excitatory electrical heart failure therapy. In some embodiments, the medical conditions are divided into the following categories:

Category 1: In some embodiments, Category 1 represents HFpEF patients presenting pulmonary capillary wedge pressure indexed to cardiac output (PCWP/CO) slope greater than 2 mm Hg/L/min. In some embodiments, performing cardiac contractility modulation treatment/non-excitatory electrical heart failure therapy will improve the HF condition and will reduce the slope or increase the average stroke volume in the affected patient.

Category 2: In some embodiments, Category 2 represents HFpEF patients presenting left ventricle ejection fraction (LVEF) greater than 50% and exercise-induced diastolic dysfunction (having Wedge Pressure greater than 25 mmHg). In some embodiments, performing cardiac contractility modulation treatment/non-excitatory electrical heart failure therapy will improve the HF condition and will reduce the wedge pressure or increase the average stroke volume in the affected patient.

Category 3: In some embodiments, Category 3 represents HFpEF patients presenting right ventricular (RV) dysfunction, and having the following conditions: a) Pulmonary hypertension; b) Right ventricular ejection fraction (RVEF) lower than 50%, 40%, 30%; or Hypertrophic RV having RVEF greater than 50%; and c) LV is preserved with ejection fraction (EF)>50%. In some embodiments, performing cardiac contractility modulation treatment/non-excitatory electrical heart failure therapy will improve the HF condition and increase the average stroke volume in the affected patient.

Category 4: In some embodiments, Category 4 represents HFpEF patients presenting LVEF greater than 50% and enlarged left atria, having one or more of the following conditions: a) Sinus rhythm; and b) Atrial fibrillation. In some embodiments, performing cardiac contractility modulation treatment/non-excitatory electrical heart failure therapy will improve the HF condition and will increase the average stroke volume in the affected patient.

Category 5: In some embodiments, Category 5 represents HFpEF patients presenting LVEF greater than 50% without cardiac amyloidosis. In some embodiments, performing cardiac contractility modulation treatment/non-excitatory electrical heart failure therapy will improve the HF condition and will increase the average stroke volume in the affected patient.

In some embodiments, as mentioned above, the medical personnel assesses if the HFpEF patient 104 presents medical conditions of category 1 106. If the answer is 'NO', then the medical personnel will assess if the HFpEF patient presents at least one medical condition from the other categories 116.

In some embodiments, as mentioned above, the medical personnel assesses if the HFpEF patient 104 presents medical conditions of category 2 108. If the answer is 'NO', then the medical personnel will assess if the HFpEF patient presents at least one medical condition from the other categories 116.

In some embodiments, as mentioned above, the medical personnel assesses if the HFpEF patient 104 presents medical conditions of category 3 110. If the answer is 'NO', then the medical personnel will assess if the HFpEF patient presents at least one medical condition from the other categories 116.

In some embodiments, as mentioned above, the medical personnel assesses if the HFpEF patient 104 presents medical conditions of category 4 112. If the answer is 'NO', then the medical personnel will assess if the HFpEF patient presents at least one medical condition from the other categories 116.

In some embodiments, as mentioned above, the medical personnel assesses if the HFpEF patient 104 presents medical conditions of category 1 114. If the answer is 'NO', then the medical personnel will assess if the HFpEF patient presents at least one medical condition from the other categories 116.

In some embodiments, when a HFpEF patient does not present any of the medical conditions of any of the categories, then the medical personnel will not provide cardiac contractility modulation therapy/non-excitatory electrical heart failure therapy to that HFpEF patient 118.

In some embodiments, when a HFpEF patient presents at least one of the medical conditions of any of the categories, then the medical personnel will provide cardiac contractility modulation therapy/non-excitatory electrical heart failure therapy to that HFpEF patient 120.

In some embodiments, a potential advantage of providing cardiac contractility modulation therapy/non-excitatory electrical heart failure therapy to a HFpEF patient having at least one of the medical conditions mentioned in any of the abovementioned categories is that it can potentially improve one or more of the following physiological parameters as following:

Increase cardiac contractility, for example an increase in cardiac contractility of from about 5% to about 10%, optionally of from about 3% to about 15%, optionally of from about 1% to about 20%.

Increase Cardiac output, for example an increase in cardiac output of from about 5% to about 10%, optionally of from about 3% to about 15%, optionally of from about 1% to about 20%.

Reduce Arrhythmia level, for example a reduction in Arrhythmia level of from about 50% to about 70%, optionally of from about 40% to about 90%, optionally of from about 30% to about 100%.

Reduce cardiac muscle stiffness, for example a reduction in cardiac muscle stiffness of from about 50% to about 70%, optionally of from about 40% to about 90%, optionally of from about 30% to about 100%.

Figure 2:
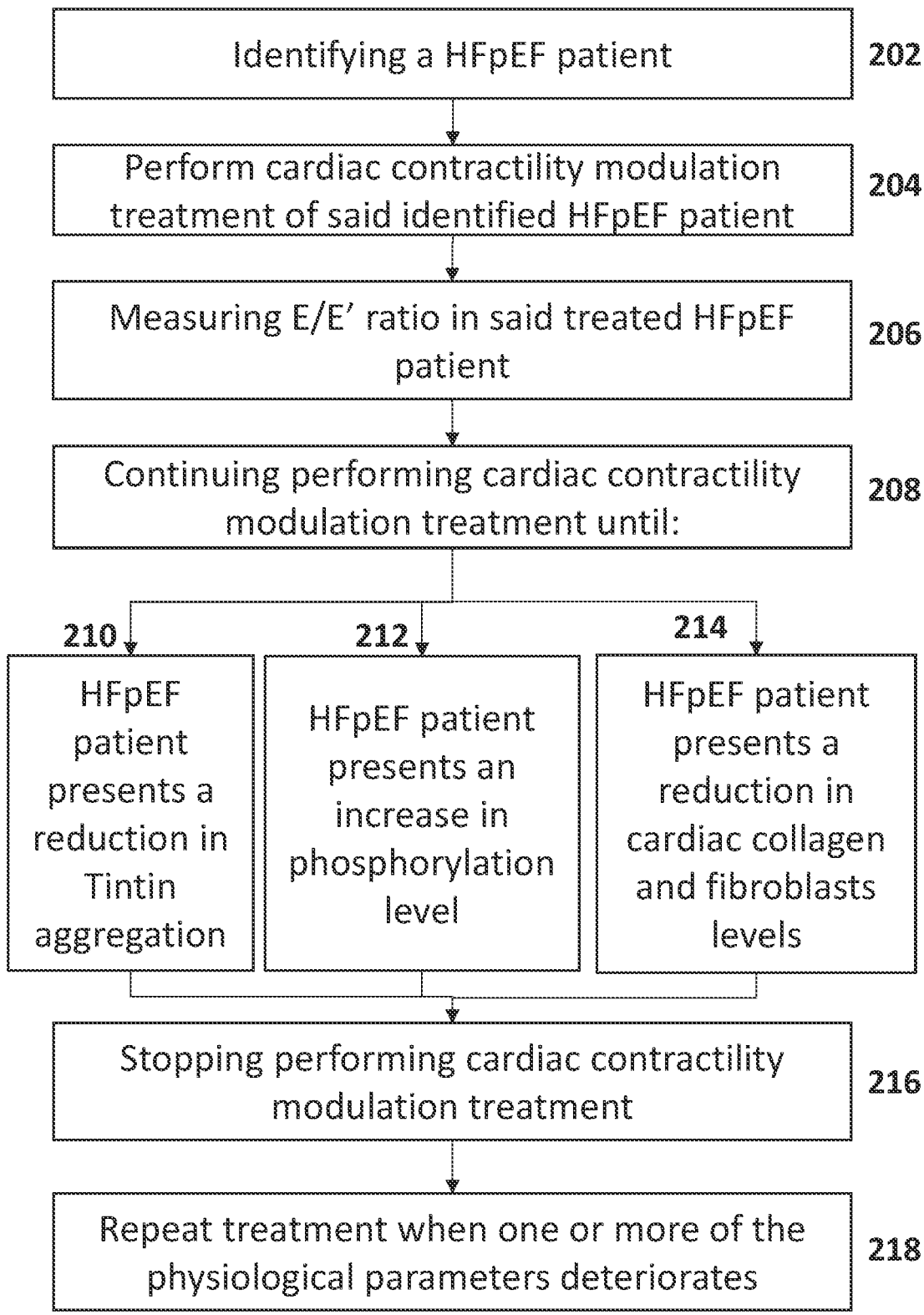
FIG. 2 is a flowchart of an exemplary method of selecting a patient for non-excitatory electrical heart failure therapy, monitoring the patient and desired outcomes of the treatment, according to some embodiments of the invention.

Referring now to FIG. 2, showing a flowchart of an exemplary method of selecting a patient for cardiac contractility modulation treatment/non-excitatory electrical heart failure therapy, monitoring the patient and desired outcomes of the treatment, according to some embodiments of the invention. In some embodiments, an HFpEF patient is identified by the medical personnel 202. In some embodiments, cardiac contractility modulation treatment is performed on the identified HFpEF patient 204. In some embodiments, E/E' ratio is measured periodically on said treated HFpEF patient 206. In some embodiments, the treatment is continued until the treated HFpEF patient presents one or more of the following physiological parameters and/or presents one or more of the following physiological parameters:

1. A reduction on Tintin aggregation, for example a reduction in Tintin aggregation of from about 50% to about 70%, optionally of from about 40% to about 90%, optionally of from about 30% to about 100%.
2. An increase in phosphorylation level in cardiac tissue, for example an increase in phosphorylation level of from about 5% to about 10%, optionally of from about 3% to about 15%, optionally of from about 1% to about 20%. In some embodiments, levels of phosphorylation are measured in biopsy samples taken from the subject.
3. A reduction in cardiac collagen and fibroblasts levels in the cardiac tissue, for example a reduction in cardiac collagen and fibroblasts levels of from about 50% to about 70%, optionally of from about 40% to about 90%, optionally of from about 30% to about 100%. In some embodiments, levels of cardiac collagen and fibroblasts are measured in biopsy samples taken from the subject.

In some embodiments, once or more of the physiological parameters improves, the treatment is either stopped 216 or reduced in frequency to possibly maintain a level of protection from deterioration. In some embodiments, the identified HFpEF patient is monitored and when one or more of the physiological parameters deteriorates, the cardiac contractility modulation treatment is repeated 218 until one or more of the physiological parameters improves.

Figure 3:
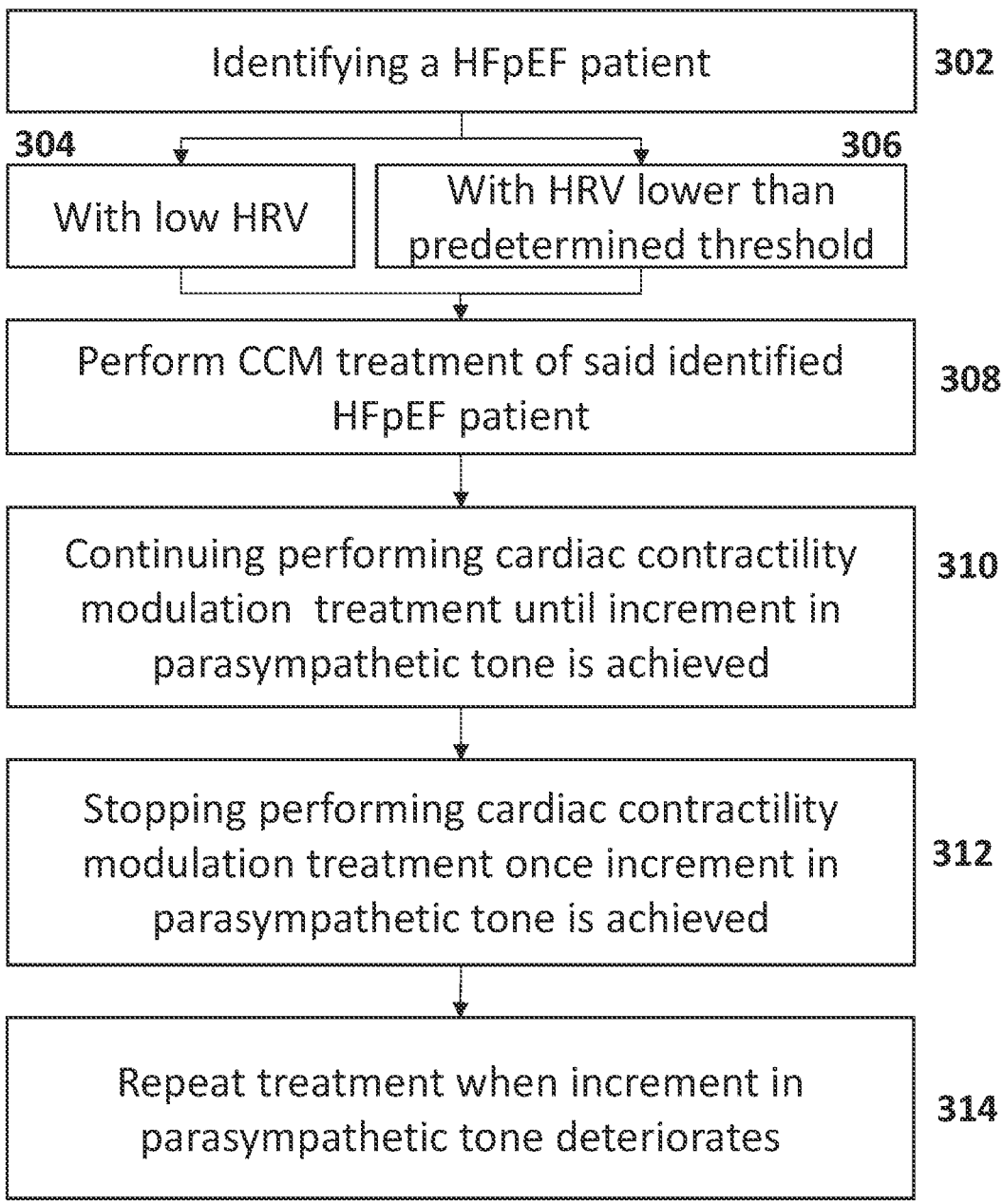
FIG. 3 is a flowchart of an exemplary method of selecting a patient for non-excitatory electrical heart failure therapy and desired outcome of the treatment, according to some embodiments of the invention.

Referring now to FIG. 3, showing a flowchart of an exemplary method of selecting a patient for cardiac contractility modulation treatment/non-excitatory electrical heart failure therapy and desired outcome of the treatment, according to some embodiments of the invention. In some embodiments, an HFpEF patient is identified by the medical personnel 302. In some embodiments, the identified HFpEF patient presents a low HRV 304 and/or presents a HRV lower than a predetermined threshold 306. In some embodiments, exemplary predetermined thresholds are, for example, below 30 mS, below 20 mS, below 15 mS, below 10 mS, below 5 mS. Taking under consideration that a normal HRV is typically in the range of about 20 mS to about 22 mS. In some embodiments, cardiac contractility modulation treatment/non-excitatory electrical heart failure therapy is performed on the identified HFpEF patient 208. In some embodiments, the treatment is continued until the treated HFpEF patient presents an increment in parasympathetic tone, for example an increment in parasympathetic tone of from about 5% to about 10%, optionally of from about 3% to about 15%, optionally of from about 1% to about 20%. In some embodiments, once the parasympathetic tone improves, the treatment is either stopped 312 or reduced in frequency to possibly maintain a level of protection from deterioration. In some embodiments, the identified HFpEF patient with either low HRV or with HRV lower than a predetermined threshold is monitored and when parasympathetic tone deteriorates, the cardiac contractility modulation treatment is repeated 314 until parasympathetic tone improves.

Figure 4:
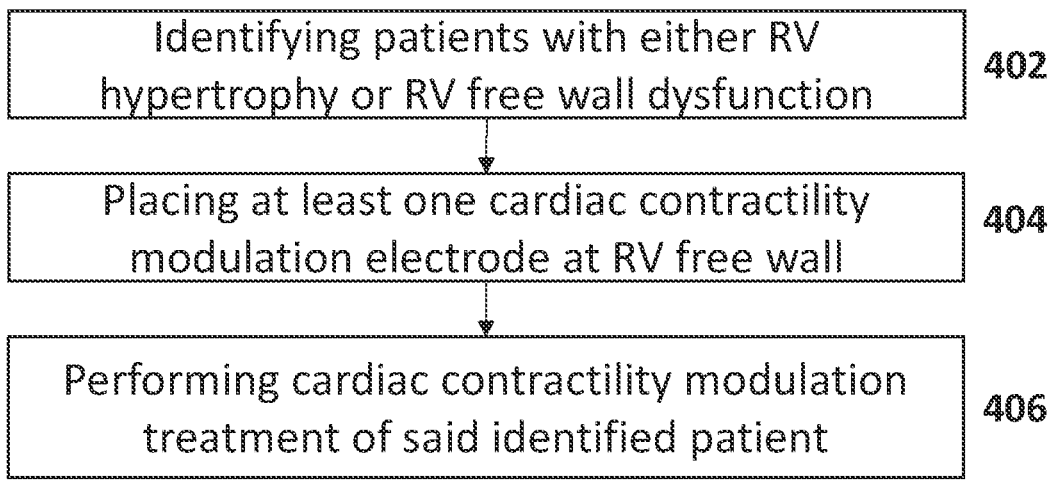
FIG. 4 is a flowchart of an exemplary method of selection of patients for alternative location of electrode placement and providing treatment thereof, according to some embodiments of the invention.

Referring now to FIG. 4, showing a flowchart of an exemplary method of selection of patients for alternative location of electrode placement and providing treatment thereof, according to some embodiments of the invention.

Typically, pacing electrodes and cardiac contractility modulation electrodes are positioned at the RV septum. Typically, no electrodes are placed at the free wall, since it was thought to be less effective for pacing. Since cardiac contractility modulation treatment/non-excitatory electrical heart failure therapy is based on delivering electrical current to the tissue in order to provide treatment, usually but not only for improvement of contractility, it would be potentially advantageous to provide stimulation at the free wall, especially when it is hypertrophic.

In some embodiments, medical personnel identifies patients showing either RV hypertrophy or RV free wall dysfunction 402. In some embodiments, medical personnel places at least one cardiac contractility modulation electrode at the RV free wall 404. In some embodiments, cardiac contractility modulation treatment/non-excitatory electrical heart failure therapy is performed on the identified patient 406. In some embodiments, a potential advantage of performing cardiac contractility modulation treatment/non-excitatory electrical heart failure therapy to patients showing either RV hypertrophy or RV free wall dysfunction is that it can potentially prevent deterioration from RV hypertrophy into ventricle dilation.

Figure 5:
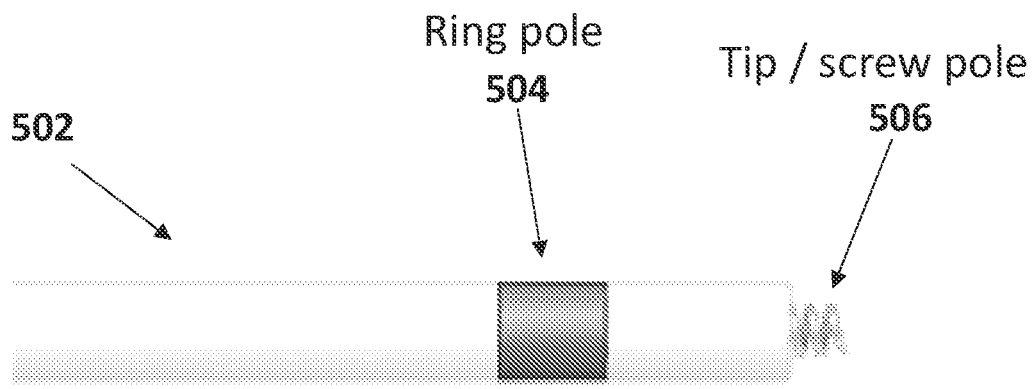
FIG. 5 is a schematic representation of a prior art screw electrode and an exemplary long screw electrode, according to some embodiments of the invention.
Figure 5:
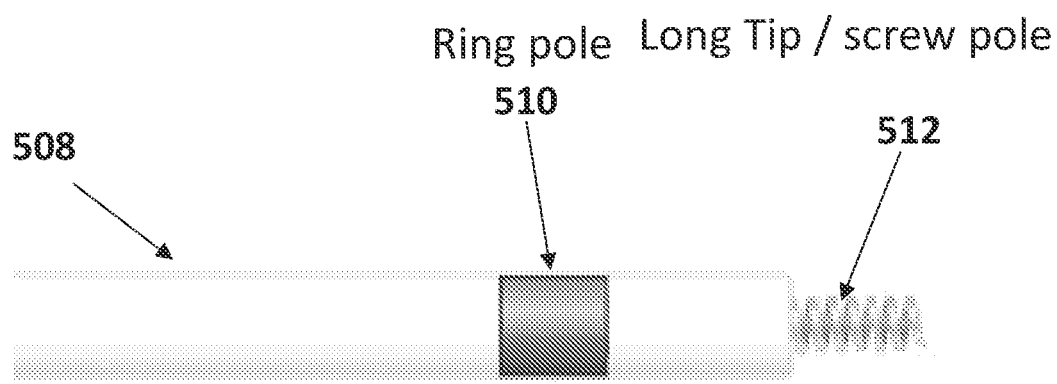

Referring now to FIG. 5, showing a schematic representation of a prior art screw electrode and an exemplary long screw electrode, according to some embodiments of the invention. Known screw electrodes 502 usually comprise, at the distal end, a ring pole 504 and a tip/screw pole 506. Usually, the length of the tip/crew pole is up to 2 mm. In some embodiments, the long screw electrode 508 according to some embodiments of the invention, comprises a ring pole 510 and a tip/screw pole 512 having a length of from about more than 2 mm to about 30 mm. In some embodiments, a potential advantage of having a long tip/screw is that since hypertrophic muscle is normally thicker, providing stimulation deeper in the muscle can potentially generate a more effective cardiac contractility modulation activation. In some embodiments, in cases where both poles are in the cardiac tissue, it is expected that most of the current will go through the tissue. Another potential advantage is the use of the long screw to pass through the septum into the LV. For example, in non-hypertrophic septum, such passage may cause perforation or leakage.

Referring now to FIGS. 6*a-c*, showing schematic representations of connected prior art screw electrode and long screw electrodes to the heart's tissue, according to some embodiments of the invention. During implantation, a prior art bipolar electrode 502 is screwed into the ventricle septum from the right ventricle 602, as shown for example in FIG. 6*a*. Typically, the screw is inserted to the depth of from about 1 mm to about 2 mm into the tissue, without passing into the left ventricle 604. In some embodiments, in cases of hypertrophic ventricle septum 606, where the walls are typically wider, the long screw electrode 508 is inserted deeper into the tissue, for example more than 2 mm, optionally more than 5 mm, optionally more than 10 mm, as shown for example in FIG. 6*b*. In some embodiments, the long screw electrode 508 that is screwed through the ventricle septum 608, optionally having the tip enter into the LV, as shown for example in FIG. 6*c*. In some embodiments, a potential advantage of passing the wall is that typically, LV electrodes are placed inside the LV coronary veins, therefore such configuration can potentially provide stimulation/pacing of the LV from a septal location.

Referring now to FIG. 7, showing a schematic representation of a variation of a long screw electrode, according to some embodiments of the invention. In some embodiments, instead of having two separate poles, one on the body of the electrode and one on the tip/crew of the electrode (as shown for example in electrode 508 in FIG. 5), the long screw electrode 702 comprises both poles 704/706 on the tip/screw, and when implanted, both poles 704/706 are inserted into the tissue, as shown for example in FIG. 7. In some embodiments, each pole comprises a length of from about 1 mm to about 3 mm. In some embodiments, a potential advantage of having a double pole on the tip/screw is that since hypertrophic muscle is normally thicker, providing stimulation deeper in the muscle can potentially generate a more effective cardiac contractility modulation activation. In some embodiments, in cases where both poles are in the cardiac tissue, it is expected that most of the current will go through the tissue. Another potential advantage is the use of the long screw to pass through the septum into the LV. For example, in non-hypertrophic septum, such passage may cause perforation or leakage.

Referring now to FIG. 8, showing a flowchart of an exemplary method of selection of patients in need for a long screw electrode and providing treatment thereof, according to some embodiments of the invention. In some embodiments, medical personnel identifies patients showing either ventricle septum hypertrophy or heart failure 802. In some embodiments, medical personnel places at least one cardiac contractility modulation long screw electrode at the RV 804 with a depth penetration of more than 2 mm. In some embodiments, cardiac contractility modulation treatment is performed on the identified patient 806.

Referring now to FIG. 9, showing a flowchart of an exemplary method of selection of patients in need for a long screw electrode and providing treatment thereof, according to some embodiments of the invention. In some embodiments, medical personnel identifies patients showing either ventricle septum hypertrophy or heart failure 902. In some embodiments, medical personnel places at least one cardiac contractility modulation long screw electrode at the RV until the distal end of the electrode enters into the left ventricle 904. In some embodiments, cardiac contractility modulation treatment is performed on the identified patient 906.

Exemplary Dosages of Non-Excitatory Electrical Heart Failure Therapy

In some embodiments, the exemplary dosages disclosed herein are defined as an effective amount and/or dosage of therapy. In some embodiments, exemplary dosages of non-excitatory electrical heart failure therapy are performed as part of a plan according to characteristics of cardiac activity and is optionally modified in view of actual cardiac activity. In some embodiments, the therapy is selected and/or performed taking into account a natural variability in the function of the heart, including both intra-person and inter-person variability.

In some embodiments, one or more parameters of the non-excitatory electrical heart failure therapy are updated, optionally in real time, to compensate for any changes made in the treatment due to actual cardiac activity.

In some embodiments, a treatment plan is defined by setting parameters such as: stimulation rate, stimulation current intensity, a duration of a treatment session, and/or other parameters. In some embodiments, the parameters are selected according to a general treatment goal, for example, a total number of cardiac electrical stimulations to be delivered to the heart, and/or a total amount of cardiac electrical stimulation energy to be delivered to the heart.

In some embodiments, the treatment plan is defined according to characteristics of cardiac activity of the patient being treated. For example, taking into account characteristics such as the patient's heart rate, stroke volume, occurrence rate of irregular cardiac events (such as arrhythmia), and/or other characteristics.

In some embodiments, the treatment plan defines one or more conditions for applying the non-excitatory electrical heart failure therapy. For example, the conditions as disclosed above. Additionally, for example, the plan defines that stimulation should be delivered only when the heart rate is lower and/or higher than a threshold (or within a selected range). For example, the plan defines that stimulation should be delivered only in certain physical states of the patient, such as only during rest.

In some embodiments, the treatment plan takes into account expected variability in cardiac activity. In some embodiments, treatment parameters such as the total number of stimulations to be delivered; the total amount of stimulation energy to be delivered; the rate of stimulating; the timing of stimulation are selected taking into account that a change in a parameter may have an effect that is non-linear on the treatment itself. Therefore, in some embodiments, multiple sets of parameters may be defined for obtaining equivalent treatment effects. For example, it may be that delivery of 8000 stimulations randomly dispersed over a day would obtain a treatment effect which is equivalent to stimulations delivered at each cardiac beat for one hour at a heart rate higher than 90 bpm. In some embodiments, systems and/or devices for example as described herein (e.g. the system controller) are preprogrammed with a look-up table including parameter sets, which optionally lead to equivalent treatment effects and may be interchanged. In some embodiments, a treatment parameter is selected and/or calculated according to one more additional treatment parameters and/or according to a desired treatment effect.

In some embodiments, cardiac electrical stimulation treatment is delivered according to the plan, but variations may be made in the plan in response to actual cardiac activity. Optionally, variations are made in real time. For example, if an irregular beat is identified, stimulation at that beat may be skipped. In some embodiments, variations in the treatment plan are made in response to actual cardiac activity measured (and optionally monitored over time) by one or more sensors, such as via ECG measurement.

In some embodiments, the variations made in the plan are compensated for, for example so as to reach the general treatment goal. In some embodiments, compensating comprises updating one or more treatment parameters, such as: updating a duration of a treatment session; updating the rate of cardiac electrical stimulations; updating the current intensity of the stimulations; updating the number of electrodes being activated (for example so as to contact a different sized area of tissue); updating the time interval and/or number of beats between consecutive stimulations; and/or other treatment parameters.

In some embodiments, an implantable device is provided, including one or more leads for delivering the cardiac electrical stimulation and a controller configured for controlling stimulation via the leads. In some embodiments, the controller is configured for automatically updating one or more treatment parameters in response to a variation made in the treatment plan due to actual cardiac activity. In some embodiments, the controller is programmed with one or more treatment plans and one or more "fallback" instructions for updating the treatment parameters when treatment is being carried out and is optionally changed due to actual cardiac activity.

Some examples of "fallback" instructions include: lengthening a treatment session duration if the number of stimulations actually delivered is smaller than a set number of stimulations; increasing an intensity of the stimulation current if the total amount of energy delivered is lower than a set amount of energy to be delivered; increasing the rate of cardiac electrical stimulations if a treatment session time period has almost ended but not enough stimulations were actually delivered; updating a heart rate threshold for applying of stimulations if the actual heart rate over the treatment session (or a part of it) was not within the defined heart rate for delivery of stimulations.

Exemplary Planning of the Treatment

Referring now to FIG. 10, showing a flowchart of a method for cardiac electrical stimulation treatment in which real time changes in scheduled treatment are compensated for, according to some embodiments of the invention.

In some embodiments, a decision is made to treat a patient by applying non-excitatory electrical heart failure therapy 1002.

In some embodiments, the non-excitatory signal is a cardiac contractility modulation signal applied to the heart, optionally during a relative and/or absolute refractory period of the cardiac cycle. In some embodiments, the signal is selected to increase the contractility of a cardiac ventricle when the electric field of the signal stimulates such ventricular tissue, for example, the left ventricle, the right ventricle and/or a ventricular septum. In some embodiments, contractility modulation is provided by phosphorylation of phospholamban caused by the signal. In some embodiments, contractility modulation is caused by a change in protein transcription and/or mRNA creation caused by the signal, optionally in the form of reversal of a fetal gene program.

It is noted that in some embodiments the cardiac contractility modulation signal may be excitatory to tissue other than that to which it is applied. Various mechanisms by which cardiac contractility modulation signals may operate are described, for example in "Cardiac contractility modulation: mechanisms of action in heart failure with reduced ejection fraction and beyond" by C. Tschope et al, European Journal of Heart Failure (2018), doi:10.1002/ejhf.1349 and may serve to guide in selecting signal application parameters in order to utilize and/or comply with one or more of these mechanisms.

The term "cardiac electrical stimulation" is used herein, unless otherwise noted, as a general placeholder for all such signals. In some embodiments, the term "cardiac electrical stimulation" is meant to cover an electroceutical, for example, a therapeutic signal. In some embodiments, stimulation is delivered to the heart and/or to associated organs or tissue. In some embodiments, the stimulation affects neural activity. In some embodiments, stimulation is delivered according to a defined dose. Optionally, stimulation is applied in synchrony with cardiac activity, e.g. in synchrony with heart beat.

In some embodiments, the cardiac electrical stimulation is applied according to parameters (e.g. current intensity, timing, rate, anatomical location of applying) suitable to cause cardiac contractility modulation. In some embodiments, the cardiac electrical stimulation comprises stimulation of the cardiac fat pad. In some embodiments, the cardiac electrical stimulation comprises affecting the heart via vagal nerve stimulation. In some embodiments, the cardiac electrical stimulation comprises stimulation of cardiac blood vessels innervation, e.g. stimulation of the aorta, vena cava, pulmonary artery, pulmonary vein.

In some embodiments, a cardiac device configured for applying cardiac electrical stimulation is implanted in the patient 1004. In some embodiments, the device comprises a pulse generator which is optionally implanted outside the heart, for example in the subclavian area, and one or more leads for stimulating the heart. Optionally, one or more leads contact the ventricular septum of the heart.

In some embodiments, treatment parameters for applying the cardiac electrical stimulation are defined 1006. In some embodiments, treatment parameters are selected and the cardiac device is programmed accordingly (e.g. the device controller).

In some embodiments, parameters of the cardiac electrical treatment include, for example: timing of stimulation (e.g. relative to the cardiac cycle and/or relative to previously applied stimulation), number of stimulations (e.g. a total number of stimulations to be applied, optionally within a defined time period), stimulation current intensity, stimulation duration, safety thresholds, stimulation rate, and/or other parameters.

In some embodiments, general treatment parameters (which may also be referred to as "treatment goals") are set, including, for example: a total amount of stimulation energy (electric power) to be delivered to the patient (optionally over or within a defined time period, such as a minute, hour, day, week, month); a total number of cardiac electrical stimulations to be delivered to the patient (optionally over or within a defined time period, such as a minute, hour, day, week, month); an accumulated duration of stimulation pulses (optionally over or within a defined time period, such as a minute, hour, day, week, month).

In some embodiments, treatment parameters are selected by clinical personnel, such as the caring physician (e.g. cardiologist). Additionally or alternatively, treatment parameters are automatically selected, e.g. by the device controller, for example based on inputted patient data.

In some embodiments, the patient data includes general patient information such as age, sex, medical condition. In some embodiments, for example as further described herein, the patient data includes known and/or estimated statistics of the patient's cardiac activity, including, but not limited to: heart rate (e.g. average, peak values); actual occurrence rate and/or expected likelihood of cardiac events, such as premature ventricular contraction (PVC), atrial arrhythmia and/or ventricle arrhythmia; stroke volume (e.g. average stroke volume); ejection fraction, cardiac output, intra cardiac pressure, intra cardiac pressure gradient measured over time, NYHA class score, peak VO2, 6 minute walk score, and/or other statistics.

In some embodiments, cardiac electrical stimulation is applied according to the selected treatment parameters 1008.

In some embodiments, actual cardiac activity is detected, including, for example, variations in heart rate (for example relative to an expected average heart rate), a cardiac event or episode, a change in stroke volume, and/or other 1010. In some embodiments, actual cardiac activity is sampled and/or continuously monitored. Optionally, one or more sensors are used for tracking the actual cardiac activity. In an example, ECG measurement is performed, optionally via an intra-cardiac electrode. Optionally, an intra-cardiac electrode used for ECG measurement is the same electrode which applies the cardiac electrical stimulation. Optionally, an intra-cardiac sensor such as a bio impedance sensor and/or a pressure sensor are used for measuring cardiac performance parameters such as ejection fraction, cardiac output, intra cardiac pressure, intra cardiac pressure gradient over time.

Optionally, upon detection of cardiac activity, for example upon detection of a change from expected cardiac activity and/or irregularity, cardiac electrical stimulation treatment is modified 1012. In an example, a scheduled cardiac electrical stimulation (i.e. a single stimulation) is not delivered when detecting an irregular cardiac beat (e.g. premature ventricular contraction (PVC), atrial arrhythmia and/or ventricle arrhythmia). In another example, a scheduled cardiac electrical stimulation is not delivered when a defibrillation signal is delivered to the heart, (optionally via the same device delivering the cardiac electrical stimulation signal). Optionally, in such situation, cardiac electrical stimulation is not delivered during a defined time period which immediately follows the defibrillation, for allowing the heart to recover from the defibrillation.

In some embodiments, treatment is modified in response to a change in heart rate. For example, treatment is modified when sensing a heart rate which is higher or lower than an average rate expected for the specific patient. For example, treatment is modified when the heart rate is 100%, 120%, 150%, 170% or intermediate, higher or lower percentage of the expected average heart rate. For example, treatment is modified when the heart rate is only 70%, 50%, 30% or intermediate, higher or lower percentage of the expected average heart rate.

In some embodiments, one or more treatment parameters are automatically updated to compensate for the modification made 1014. Any of the above mentioned treatment parameters may be modified, or a combination thereof.

In some embodiments, treatment is updated in real time, for example during a stimulation session, for example during a daily stimulation session consisting of several hours (e.g. 1, 2, 3, 4, 5, 6 hours or intermediate longer or shorter time period) over which stimulation is provided by the device. In some embodiments, treatment is updated in response to detection of the irregular cardiac event. Additionally or alternatively, treatment is updated based on the action taken by the device in response to that event (for example, a skipped stimulation).

Following are examples of compensations made in response to a modification in treatment that may be performed due to actual cardiac activity:

In some embodiments, according to a planned treatment, cardiac electrical stimulation is synchronized to be delivered at each cardiac cycle. For example, a cardiac contractility modulation signal is applied during the refractory period. Under such scheduling, a patient whose actual heart rate (i.e. the heart rate during at least a part of a treatment session) is higher than an expected average may receive an excess number of stimulations, and a patient whose heart rate is lower than an expected average may receive fewer stimulations than planned. In some embodiments, to compensate for the variation, parameters such as the treatment session duration or the stimulation current intensity may be updated. For example, for the patient with the higher heart rate: the treatment session duration may be shortened, thereby reducing or avoiding excess stimulations; the stimulation current intensity may be reduced, so that a total amount of energy delivered over a treatment session remains as planned. For example, for the patient with the lower heart rate: the treatment session duration may be lengthened in attempt to reach the planned amount of stimulations; the stimulation current intensity may be increased, so that a total amount of energy delivered over a treatment session reaches the planned amount. In some embodiments, stimulation current intensity is set by controlling (optionally, modulating) a voltage set by the device. In some embodiments, current intensity (or amplitude) is set by setting output voltage under the assumption that electrical impedance of device components (such as the one or more stimulation leads) remains substantially constant, and does not change. In some embodiments, an amplitude of the output voltage is controlled to result in a selected stimulation current.

In some embodiments, when a stimulation is skipped or cancelled, such as in response to an irregular cardiac beat, compensation may include: increasing a duration of the treatment session so as to deliver additional stimulation(s); increasing current intensity in one or more subsequent stimulations so as to compensate for the amount of energy that was not delivered; increasing the size (e.g. surface area) of tissue being contacted by the device electrodes and stimulated. In some cases, a cardiac electrical stimulation is not applied at a heartbeat when the heartbeat is deemed unsafe in the sense that a cardiac electrical stimulation signal might cause an arrhythmia if applied during that beat. Optionally or additionally, the heart may be allowed to "recover" from an arrhythmic beat for one or more "prohibition" beats. In some embodiments, compensation for a stimulation that was not applied intentionally may include: increasing a duration of the treatment session so as to deliver additional stimulation(s); increasing current intensity in one or more subsequent stimulations so as to compensate for the amount of energy that was not delivered; increasing the size (e.g. surface area) of tissue being contacted by the device electrodes and stimulated; and/or other change in treatment parameters.

Referring now to FIG. 11, showing a flowchart of an exemplary method for planning cardiac electrical stimulation treatment and optionally modifying treatment in accordance with actual cardiac activity, according to some embodiments of the invention.

In some embodiments, cardiac electrical stimulation treatment is planned according to known and/or estimated statistics of the patient's cardiac activity 1102.

In some embodiments, general treatment parameters (or goals) are defined, including, for example: a total number of stimulations to be delivered; a total amount of energy to be applied via the stimulation(s); a total number of stimulations to be delivered within a certain time window (e.g. within a 1 hour window, a 12 hour window, a 24 window, or intermediate, longer or shorter time windows); a total duration of stimulation pulses to be delivered within a certain time window (e.g. within a 1 hour window, a 12 hour window, a 24 window, or intermediate, longer or shorter time windows). In an example, the total number of stimulations is set for between 5000-50000 stimulations per day, such as 5500, 20000, 40000 or intermediate, higher or smaller amount of stimulations per day. In an example, a rate of stimulation set for between 200-3000 stimulations per hour, such as 300, 1000, 2500 or intermediate, higher or lower rate of stimulations per hour.

In some embodiments, to achieve the general goals, cardiac electrical stimulation treatment is planned taking into account the patient's known and/or expected cardiac activity, for example according to patient's statistics such as: heart rate (e.g. average, peak and/or base); stroke volume; likelihood of cardiac events (such as premature ventricular contraction (PVC), atrial arrhythmia or ventricle arrhythmia); a likelihood of the need of defibrillation, and/or other statistics.

In some embodiments, the plan defines dosages. A dosage may include, for example, a time period (e.g. within a 24 hour window) over which stimulation is applied. For example, the plan defines that cardiac electrical stimulation will be delivered over 1, 2, 3, 5, 6, 8 hours or intermediate, longer or shorter time period each day. Optionally, stimulation is delivered intermittently (e.g. with a non-stimulation time period between stimulation time periods, such as 1 hour stimulation; 2 hour break; 1 hour stimulation, etc.). In some embodiments, stimulation is applied over a time period of 5 hours, 6 hours, 7 hours or intermediate, longer or shorter time periods per each day. Optionally, during the defined time period, a target number and/or percentage of cardiac electrical stimulations is set, for example, so that stimulation will be applied at each cardiac beat for over at least 60%, 70%, 80% or intermediate, higher or smaller percentage over the defined time period.

In some embodiments, the plan defines that stimulation will be delivered at every heart beat during the selected time period. Alternatively, the plan defines delivering stimulation at spaced apart beats, for example every $3^{rd}$ beat, every $7^{th}$ beat, every $10^{th}$ beat or intermediate, larger or smaller number of beats.

In some embodiments, treatment for a specific patient is planned so that stimulation will be delivered at selected times of cardiac activity, for example when the heart rate is higher than a certain threshold, or when the heart rate is lower than a certain threshold. Optionally, the threshold is the patient's average heart rate.

In some embodiments, treatment for a specific patient is planned so that stimulation will be delivered during selected physiological and/or physical states of the patient, for example, stimulation is delivered only during sleeping; stimulation is delivered only during rest; stimulation is delivered only during physical activity; or the like.

In some embodiments, a fixed dose is defined, for example, a defined total amount of stimulations to be delivered per day. Optionally, the rate of stimulation during the day is controlled in real time based on one or more of:

- patient's activity (for example, delivering more stimulations when the patient is active as compared to when the patient is resting, or vice versa);
- conditions of the patient surroundings, such as weather conditions (for example, delivering more stimulations when the surrounding temperature (optionally as sensed by a system temperature sensor) is within a range or under or over a selected threshold. For example, in temperatures in which it may be harder to maintain body temperature, such as higher than 35 degrees C., lower than 5 degrees C.) it may be desired to reduce the rate of applying cardiac electrical stimulation;
- the patient's posture, for example, delivering more stimulations when the patient is standing and less when the patient is sitting and/or laying down, or vice versa. Optionally, the patient's posture is sensed using a sensor, such as a gyro and/or other inertial motion sensor.

In some embodiments, the device is configured for detection of conditions suitable for delivering the stimulation. In some embodiments, the device is configured for detection of cardiac activity, such as via an ECG measurement performed by a device electrode. Optionally, the measured cardiac activity also provides an indication of physical activity performed by the patient, and if the patient is at an active state or at a rest state.

In another example, the device is configured for detection of physical and/or physiological states of the patient so as to deliver the stimulation in a preferred state. For example, the device is configured for detecting sleep or wake states. For example, the device is configured to determine the patient's posture. For example, the device is configured to detect if the patient is performing physical activity, such as walking. In some embodiments, determination of the patient's activity and/or status and/or posture is performed based on input from one or more sensors, such as a GPS, gyro, microphone, and/or others. Optionally, the sensors are configured on a user's personal device such as a cell phone, which communicates with the stimulation device controller.

Additionally or alternatively, indications and/or conditions of the patient are inputted into the device (e.g. via a user interface) so as to set the applying of cardiac electrical stimulation accordingly. For example, to set the applying when cardiac activity is at certain characteristics (e.g. heart rate) and/or when the patient is at certain physical state and/or physiological states.

In some embodiments, the patient may voluntarily affect treatment (e.g. via the user interface), for example, by setting preferred hours (e.g. during a day) in which stimulation should be delivered. In an example, the patient may ask to be treated one hour during the morning, and another hour during the evening. In some embodiments, the system (e.g. via the system controller and user interface) is configured to suggest the patient options for treatment time and/or stimulation rate and/or stimulation intensity, and the patient can select from the available options based on their preferences.

In some embodiments, cardiac electrical stimulation treatment starts and is delivered according to the plan 1104.

In some embodiments, optionally, treatment is modified according to a fallback plan so as to comply with actual cardiac activity 1106. Optionally, treatment is modified in attempt to reach the general treatment goal, such as the total number of stimulations delivered; a total amount of stimulation energy; delivery during a certain amount of specific heart beats (e.g. heart beats immediately following an irregular cardiac event); and/or other general treatment goal.

Some examples of situations in which treatment may be modified from an original plan to a fallback plan include: a change in actual heart rate from an expected (e.g. average) heart rate; irregular cardiac events (e.g. arrhythmia), delivery of a different signal to the heart, such as a defibrillation signal.

The following are examples of scenarios in which modification of the treatment plan, optionally according to a fallback plan, may take place:

The original plan defines delivery of cardiac electrical stimulation when the patient's heart rate is between 60-100 bpm, and that the patient should be treated for a total of at least one hour a day (within a 24 hour window). However, in a 23 hour time period, the patient's heart rate did not reach the defined bpm range. In such case, the original plan may be modified to deliver, within the remaining hour of the 24 hour window, stimulation at any heart rate.

FIG. 12a schematically shows scheduled cardiac electrical stimulation dosing and modified cardiac electrical stimulation dosing which compensates for changes in the scheduled dosing due to actual cardiac activity, according to some embodiments of the invention.

In some embodiments, stimulation 12001 is planned to be applied with intervals between consecutive stimulations, for example, stimulation is scheduled to be applied with an interval 12003 of 6 heart beats (as shown), of 4 heart beats, 2 heart beats, 10 heart beats or intermediate, larger or smaller number of heart beats constituting the interval. In some cases, the scheduled stimulation is modified in real time based on actual cardiac activity. For example, an event 12005 such as an irregular beat is detected, optionally by the device (such as via ECG measurement). Optionally, the device is configured not to stimulate during an irregular beat, so a scheduled stimulation is skipped. As shown in the lower bar, due to the detected cardiac event and skipped stimulation, the next stimulation is applied at a 12-beat interval.

In some embodiments, to compensate for a skipped stimulation, a total duration 12007 of a treatment session is lengthened, so that another stimulation may be delivered in order to reach a total desired amount of stimulations within the session.

FIG. 12b schematically shows optional cardiac electrical stimulation treatments set in accordance with a total amount of stimulation energy to be delivered, according to some embodiments. In this example, a total amount of cardiac electrical stimulation energy 12015 is set as a general goal for treatment. To reach this amount, stimulation may be delivered as a plurality of stimulations at an equal intensity 12017, optionally delivered with intervals in between (see 12B1) or in a serial manner (see 12B2). Alternatively, (see 12B3), a plurality of stimulations 12019, 12021 may differ in intensity from each other, so that the sum of the stimulations reaches the set total amount of energy.

In some embodiments, where stimulation causes pain or sensation to the patient, the current intensity is reduced. Optionally, if stimulation does not cause pain (or the pain is bearable to the specific patient), current intensity may be increased, potentially shortening the total number of stimulations needed and/or the total duration of treatment.

Some examples of energy settings may include: reaching a total amount of 100 jouls of cardiac electrical stimulation energy per day; a total amount of 5 jouls of cardiac electrical stimulation energy per hour; a total amount of 0.1 jouls of cardiac electrical stimulation per minute; and/or other.

In some embodiments, a total amount of energy to be delivered is calculated (for example automatically calculated by the device controller) by multiplying the number of stimulation pulses by the stimulation current amplitude and/or by multiplying the number of stimulation pulses by an output voltage (for example, the voltage released by the pulse generator).

FIG. 13 is a flowchart of an exemplary method for setting and/or modifying cardiac electrical stimulation treatment dosing, according to some embodiments.

In some embodiments, cardiac electrical stimulation treatment is planned to provide a set dose (SD) of stimulations (i.e. stimulation pluses) during a set time period (TP) (1301). In some embodiments, the set time period includes 1 day, a set number of hours (e.g. 1, 2, 5, 10, 15, 20 or intermediate, longer or shorter duration); a set number of minutes (e.g. 5 minutes, 10 minutes, 30 minutes, 45 minutes or intermediate, longer or shorter duration). Some examples of doses set per time periods include 25,000 stimulation pulses a day; 1000 stimulation pulses per hour; 20 stimulation pulses per minute or intermediate, higher or smaller amount of set pulses.

In some embodiments, cardiac electrical stimulations are delivered according to the set schedule (1303). Then, at the end of the set time period, the number of actual stimulation pulses (NSP) delivered during the set time period are calculated (1305). (Optionally, the number of actual pulses delivered is a counted by the device controller).

In some cases, the number of actual stimulation pulses (NSP) may differ from the set dose (SD), for example, be smaller than the set dose (1307). This may occur, in some cases, due to skipped stimulations, for example in view of irregular heart beats, in view of the actual heart rate not being within a defined range suitable for stimulation, and/or other circumstances which caused the delivered stimulation to differ from the planned one.

In case the number of actual stimulation pulses is smaller than the set dose, the schedule may be updated to deliver more stimulations during a similar upcoming time period (1309); or, alternatively, be updated to deliver less stimulations during a similar upcoming time period, so as to comply with the "real life" likelihood of delivering the planned stimulations (1311).

In some embodiments, stimulation is applied only if and when a patient's rate heart is higher or lower than a set threshold, or within a defined range. Optionally, the threshold is dynamically modified in view of actual cardiac activity so at to reach the set dose (such as to reach the set number of stimulation).

In some embodiments, the cardiac electrical stimulation is planned for delivery at each heart beat over a certain time period (e.g. over several hours a day); additionally or alternatively, stimulation is planned for delivery every set number of heart beats; additionally or alternatively, the plan defines stimulation time(s) and off-time during which stimulation is not delivered.

In some embodiments, planning is performed (and/or the treatment plan is modified) according to an actual stimulation pulses delivered during one or more previous treatment sessions and recorded by the device. For example, if the number of stimulation pulses that were actually delivered during a previous treatment session was only 20%, 50%, 75% or intermediate, higher or lower percentage of the planned number of stimulation, a time period for the next treatment may be adjusted (e.g. lengthened) and/or the number of stimulation pulses to be provided during a time period identical to that of the previous session may be reduced, to be closer to the number of stimulation pulses actually delivered.

In an example, if the number of stimulation pulses delivered during a 5 hour treatment session was only 50% of the planned number of stimulation pulses, the plan can be modified by lengthening the treatment session to 10 hours, for example so as to reach the predefined number of stimulation pulse.

In an example, if the number of stimulations pulses that were actually delivered is lower than the planned total number of stimulations by more than 10%, 20%, 25%, 30% or intermediate, higher or smaller percentage, the plan can be modified (e.g. by lengthening the treatment session duration).

Exemplary Devices and Systems for the Treatment

FIG. 14a is a schematic block diagram of an exemplary cardiac therapy device 1400, in accordance with some embodiments of the invention.

Device 1400, as shown, includes one or more leads 1402 (optionally two leads), which are optionally couplable to device 1400 at one or more can connectors (not shown).

A pulse generator 1404 is optionally used to generate the signal, for example, including a power circuitry, for example, including one or more storage capacitors.

In some embodiments of the invention, a ventricular detector 1406 is provided and used to detect atypical ventricular activation, which can be a contra-indication to signal application.

In some embodiments of the invention, an atrial detector 1408 is provided and used to detect atypical atrial activation, which may be used as an input to decision making by device 1400.

A sensor input 1410 may receive data from one or more sensors, for example electrical sensors or other sensors, such as flow, pressure and/or acceleration sensors. Data from the sensors is optionally further processed (e.g., by a controller 1412 and/or detectors 1406, 1408) and are optionally be used as an input to decision making processes in device 1400.

A controller 1412 is optionally provided and executes one or more logics to decide, for example, a timing and/or other parameters of a signal and/or if a signal is to be applied.

In some embodiments, the controller controls the applying of stimulation pulses according to the treatment plan. Optionally, the controller effects a change in the plan, for example so as to compensate for real time deviations from the treatment plan (e.g. a skipped stimulation).

A memory 1414 is optionally provided, for example, to store logic, past effects, therapeutic plan, adverse events and/or pulse parameters.

In some embodiments, the controller and/or memory are programmed with one or more treatment plans (optionally set for the specific patient) and/or with one or more fallback treatment plans.

In some embodiments, instructions for "compensating" for a change from the planned treatment are stored and are addressed by the device controller when relevant, including for example modifications in treatment duration, number of stimulations, stimulation signal parameters (e.g. current intensity), and/or other modifications which may be applied to compensate for a real time change in the original plan. In some embodiments, the instructions include numerical factors according to which one or more parameters of treatment are modified. In some examples, the instructions may include: a factor by which the stimulation current intensity should be multiplied in case the actual applied stimulations did not reach the target amount of energy; a factor by which output voltage should be modulated to result in the desired current intensity; a factor by which the stimulation rate should be multiplied in case the actual applied stimulation did not reach the target total number of stimulations (optionally within a set time period); time related modifications such as factors by which the treatment session duration should be lengthened in case a target was not reached; and the like.

In some embodiments, the controller refers to a look up table or the like which ties between specific situations (e.g. a skipped stimulation, number of actual stimulations delivered being lower than planned, etc.) and the instructions for compensating for that situation (e.g. by updating one or more parameters, such as updating the length of a treatment session).

A logger 1416 is optionally provided to store activities of device 1400 and/or of the patient. Such a log and/or programming may use a communication module 1418 (e.g., of a type known in the art) to send data from device 1400, for example, to a programmer (not shown) and/or to receive data, for example, programming, for example, pulse parameters.

FIG. 14b is a schematic diagram showing components of an implantable cardiac device 1420, according to some embodiments.

In some embodiments, the device is configured for delivery of cardiac electrical stimulation, such as cardiac contractility modulation stimulation. Optionally, the device is further configured to function as cardioverter defibrillator (ICD).

In some embodiments, the device comprises an ICD lead 1422, and a cardiac contractility modulation lead 1424.

In some embodiments, activation of the ICD lead is by an ICD module which includes or is connected to: ICD control 1426, a defibrillation pulse generator 1428 (via one or more capacitors 1430), a power source (e.g. a battery 1432) and power source management circuitry 1434, and ICD sense 1436 which senses an applied pulse to verify the pulse is within a selected (e.g. programmed) amplitude and/or duration. In some embodiments, activation of the one or more cardiac contractility modulation leads 1438, 1440, which are optionally positioned in the right ventricle, is by a cardiac contractility modulation module which includes or is connected to: cardiac contractility modulation control 1442, a cardiac contractility modulation generator 1444.

It is noted that in some embodiments, the ICD coil and one more electrodes for pacing and/or cardiac contractility modulation are configured on the same lead.

In some embodiments, the leads are connected to isolation 1446.

In some embodiments, the device comprises a housekeeping module 1448, which includes or is connected to one or more sensor such as a temperature sensor 1450, a magnetic sensor 1452, and communication means 1454 such as an antennae, a receiver and the like. Other sensors may include flow sensors, pressure sensors, acceleration sensors, and/or other.

In some embodiments, data received from the one or more sensors is received as input. Optionally, the input is processed by the device control (e.g. by the ICD control, cardiac contractility modulation control, and/or a general controller, not shown) and is optionally used as input to decision making processes in device 1420.

In some embodiments, the device control (e.g. the ICD control, cardiac contractility modulation control, and/or a general controller, not shown) executes one or more logics to decide, for example, a timing and/or other parameters of a signal and/or if a signal is to be applied.

A memory (not shown) is optionally provided, for example, to store logic, past effects, therapeutic plan, adverse events and/or pulse parameters.

A logger (not shown) is optionally provided to store activities of device 1420 and/or of the patient. Such a log and/or programming may use a communication module 1454 to send data from device 1420, for example, to a programmer (not shown) and/or to receive data, for example, programming, for example, pulse parameters.

FIG. 15a schematically illustrates an exemplary implanted device configured for applying cardiac electrical stimulation, according to some embodiments of the invention.

In some embodiments, implantable device 1501 comprises a pulse generator 1503. In some embodiments, pulse generator 1503 comprises a housing 1509 which encases, for example: powering means (e.g. a battery), control circuitry (e.g. a controller) configured for timing and generating the electrical pulses, sensing circuitry, communication circuitry, memory means, and/or other operational modules.

In some embodiments, one or more stimulation leads such as 1505, 1507 are connected to the housing and extend externally from it. In some embodiments, a lead comprises one or more electrical wires, surrounded by an external insulating layer. In some embodiments, a lead is comprised of two wires, having different polarities. In some embodiments, a wire of the lead is coiled.

In some embodiments, pulse generator 1503 is implanted outside the heart, for example in the subclavian area. Optionally, implantation is via a minimally invasive procedure.

In some embodiments, a housing of pulse generator 1503 is implanted subcutaneously, in proximity of the left chest.

In some embodiments, leads 1505 and 1507 extend from pulse generator 1503, and at least a distal segment of the leads is implanted within the heart 1511. In some embodiments, as shown, both leads are passed through the right atrium 1513, and contact, at their distal ends, the ventricular septum 1515. In some embodiments, each lead contacts the septum at a different location.

It is noted that additionally or alternatively, a single lead which includes two spaced apart stimulation electrodes may be used.

It is also noted that while the figures shows both leads being positioned in the right ventricle 1531 against ventricular septum 1515, one or more stimulating leads may be in other locations, with consequently different effect circles and/or targeting different tissues. In some embodiments, the leads are located inside the heart, on the right side thereof optionally to take advantage of two potential advantages: a. less out-of-heart tissue being stimulated; and b. less invasive access and/or presence than in the left heart.

In some embodiments, one of the leads is implanted outside the heart, and the other lead is implanted inside the heart.

In some embodiments, each of the leads ends with a tip electrode (see 1517 of lead 1507, 1519 of lead 1505). The tip electrode may be configured as a contact electrode, a screw-in electrode, a sutured electrode, a free-floating electrode and/or other types.

In some embodiments, one or both of the leads includes a ring electrode (see 1521 of lead 1507, 1523 of lead 1505), located along the lead, proximally to the tip electrode.

In some embodiments, the electrodes are implanted in the right ventricle or in the right atria of the heart.

In some embodiments, a tip electrode is formed with a threading so as to be threaded into the tissue. Alternatively, a tip electrode is solely placed in contact with the tis sue.

In some embodiments, one or both of the leads includes a defibrillation coil (see 1525 of lead 1505). Optionally, coil 1525 is located along the lead, proximally to the tip electrode and/or proximally to the ring electrode.

In some embodiments, the coil is implanted in the right ventricle, right atria or in the vena cava.

In some embodiments, one or both leads are configured to deliver a non-excitatory signal such as a cardiac contractility modulation signal.

In some embodiments, the cardiac contractility modulation signal is applied in contact with the ventricular tissue or within ventricular tissue.

In some embodiments, the cardiac contractility modulation signal is applied to the heart during a relative and/or absolute refractory period of the heart. In some embodiments, the signal is selected to increase the contractility of a cardiac ventricle when the electric field of the signal stimulates such ventricular tissue, for example, the left ventricle, the right ventricle and/or a ventricular septum. In some embodiments of the invention, contractility modulation is provided by phosphorylation of phospholamban caused by the signal. In some embodiments of the invention, contractility modulation is caused by a change in protein transcription and/or mRNA creation caused by the signal, optionally in the form of reversal of a fetal gene program. It is noted that in some embodiments the cardiac contractility modulation signal may be excitatory to tissue other than that to which it is applied.

While not being limited to a single pulse sequence, the term cardiac contractility modulation is used to describe any of a family of signals which includes a significant component applied during an absolute refractory period and which has a clinically significant effect on cardiac contractility in an acute and/or chronic fashion and/or which causes a reversal of fetal gene programs and/or which increases phosphorylation of phospholamban. In some embodiments, the signal is potentially excitatory to one part of the heart but non-excitatory to other parts. For example, a signal can be excitatory in atria, but applied at a timing (relative to ventricular activation) when it is not excitatory in the ventricle.

In some embodiments of the invention, the signal while potentially stimulatory during the receptive period of the cardiac cycle, is non-excitatory due to its timing. In particular, the signal is applied during the refractory period of the tissue which is affected by it and, optionally, within the absolute refractory period.

In some embodiment, a device electrode, for example the cardiac contractility modulation applying electrode, is used for measuring the R wave amplitude and/or RR interval of the cardiac cycle.

FIG. 15*b* schematically illustrates an exemplary cardiac device comprising a plurality of leads, according to some embodiments of the invention. In some embodiments, device 5500 is configured for delivering cardiac contractility modulation stimulations to the heart. In some embodiments, device 5500 is further configured to function as a cardiac defibrillator (ICD).

In some embodiments, device 5500 comprises a plurality of leads. In the example shown, a first lead 5510 extends to the right atrium of the heart 5516; a second lead 5511, such as for applying cardiac contractility modulation stimulation, extends to the right ventricle, optionally contacting the ventricular septum; a third lead 5512 extends to the right ventricle, optionally contacting the ventricular septum; and a fourth lead 5514 extending to the left ventricle, for example through the coronary sinus. In some embodiments, one or more of the leads comprises a defibrillation coil. In this example, lead 5512 comprises a superior-vena cava shock coil 5530 and a right ventricle shock coil 5532.

In some embodiments, the plurality of leads are connected to the device housing 5520 via a plurality of ports (not shown). In some embodiments, control of activation of one or more leads is via switch circuitry, for example switch circuitry of the device controller.

Exemplary General Information about Planning and Devices

In some embodiments, the method for cardiac electrical stimulation, comprises: defining a treatment plan including parameters according to which cardiac electrical stimulations are applied to the heart; applying cardiac electrical stimulations to the heart according to the treatment plan; during applying, adapting the treatment to actual cardiac activity; and automatically updating at least one of the parameters to compensate for any changes made relative to the treatment plan due to the adapting.

In some embodiments, the parameters include one or more of: a rate of cardiac electrical stimulations; a time period over which cardiac electrical stimulations are to be applied; stimulation current; an output voltage; a duration of each stimulation.

In some embodiments, defining a treatment plan comprises selecting the parameters so as to deliver one or both of: a total number of cardiac electrical stimulations; a total amount of cardiac electrical stimulation energy.

In some embodiments, automatically updating comprises one or more of: increasing or reducing the rate of cardiac electrical stimulations; lengthening or shortening the time period over which cardiac electrical stimulations are applied; increasing or reducing the stimulation current intensity; lengthening or shortening the stimulation duration.

In some embodiments, defining a treatment plan comprises measuring or receiving input of cardiac activity characteristics of a patient being treated.

In some embodiments, the cardiac activity characteristics include: average heart rate, average stroke volume, occurrence rate of irregular cardiac events.

In some embodiments, the irregular cardiac events are from the group of: premature ventricular contraction (PVC), atrial arrhythmia or ventricle arrhythmia.

In some embodiments, applying comprises delivering an electrical stimulation via an implanted device comprising one or more leads which contact the ventricular septum of the heart.

In some embodiments, the method comprises measuring the actual cardiac activity using one or more sensors.

In some embodiments, defining a treatment plan comprises setting one or more thresholds of a heart rate during which the cardiac electrical stimulations are to be applied.

In some embodiments, defining a treatment plan comprises selecting one or more physical states of the patient during which the cardiac electrical stimulations are to be applied.

In some embodiments, automatically updating is performed in response to one or more skipped stimulations.

In some embodiments, automatically updating is performed if a number of cardiac electrical stimulations that were actually delivered is lower than a planned number of cardiac electrical stimulations.

In some embodiments, automatically updating is performed if a total amount of cardiac electrical stimulation energy delivered is lower than a planned amount of cardiac electrical stimulation energy.

In some embodiments, the cardiac electrical stimulation comprises cardiac contractility modulation stimulation.

In some embodiments, the method for delivering a therapeutic stimulation to the heart, comprises: selecting a total number of stimulations to be delivered to the heart over a selected period of time; delivering stimulations to the heart; counting the number of stimulations actually delivered; if the number of stimulations actually delivered is lower than the selected total number of stimulations, adding a selected time period at an extent sufficient to deliver the required additional stimulations.

In some embodiments, the stimulations comprise cardiac contractility modulation stimulations.

In some embodiments, the method comprises adding the selected time period to deliver additional stimulations if the number of stimulations actually delivered is lower than 90% of the selected total number of stimulations.

In some embodiments, adding a selected time period comprises extending the period of time that was initially selected.

In some embodiments, if the number of stimulations actually delivered is lower than the selected total number of cardiac contractility modulation stimulations, reducing the selected total number of cardiac contractility modulation stimulations for a future stimulation session.

In some embodiments, the selected time period is between 4 hours-8 hours a day.

In some embodiments, the method for planning cardiac electrical stimulation treatment, comprises: selecting a total amount of energy to be delivered by cardiac electrical stimulations to the heart; and selecting one or both of: a time period during which cardiac electrical stimulations are to be applied to the heart, and stimulation current intensity for each of the stimulations, the time period and the stimulation current intensity selected so as to reach the total amount of energy.

In some embodiments, the cardiac electrical stimulation comprises cardiac contractility modulation stimulation.

In some embodiments, the system for cardiac electrical stimulation treatment, comprises: an implantable pulse generator; one or more leads extending from the pulse generator to the heart for applying cardiac electrical stimulation; a controller programmed with at least one treatment plan for applying cardiac electrical stimulations, the controller configured to automatically update the treatment plan in response to actual cardiac activity by updating one or more of: a time period during which cardiac electrical stimulations are applied; a rate of cardiac electrical stimulations; an amount of energy delivered at each cardiac electrical stimulation.

In some embodiments, the system comprises one or more sensors including an ECG sensor configured for measuring the actual cardiac activity.

In some embodiments, one or more leads contact the ventricular septum of the heart.

In some embodiments, the controller is programmed with instructions for automatically updating the treatment plan, the instructions suitable to compensate for real time changes in the treatment plan.

In some embodiments, the instructions include numerical factors according to which one or more of the following parameters are updated: stimulation current intensity; output voltage which sets a selected stimulation current intensity; stimulation duration; treatment session duration; stimulation rate.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

In some embodiments, planning and delivering cardiac electrical stimulation treatment are performed and, more particularly, but not exclusively, cardiac electrical stimulation treatment which parameters can be updated based on and/or in response to actual cardiac activity are performed.

In some embodiments, the stimulation treatment is planned according to characteristics of cardiac activity and is optionally modified in view of actual cardiac activity. In some embodiments, stimulation is selected and/or performed taking into account a natural variability in the function of the heart, including both intra-person and inter-person variability.

In some embodiments, updating one or more parameters of cardiac electrical stimulation treatment, optionally in real time, is performed to compensate for any changes made in the treatment due to actual cardiac activity.

In some embodiments, a treatment plan is defined by setting parameters such as: stimulation rate, stimulation current intensity, a duration of a treatment session, and/or other parameters. In some embodiments, the parameters are selected according to a general treatment goal, for example, a total number of cardiac electrical stimulations to be delivered to the heart, and/or a total amount of cardiac electrical stimulation energy to be delivered to the heart.

In some embodiments, the treatment plan is defined according to characteristics of cardiac activity of the patient being treated. For example, taking into account characteristics such as the patient's heart rate, stroke volume, occurrence rate of irregular cardiac events (such as arrhythmia), and/or other characteristics.

In some embodiments, the treatment plan defines one or more conditions for applying the cardiac electrical stimulation. For example, the plan defines that stimulation should be delivered only when the heart rate is lower and/or higher than a threshold (or within a selected range). For example, the plan defines that stimulation should be delivered only in certain physical states of the patient, such as only during rest.

In some embodiments, the treatment plan takes into account expected variability in cardiac activity. In some embodiments, treatment parameters such as the total number of stimulations to be delivered; the total amount of stimulation energy to be delivered; the rate of stimulating; the timing of stimulation are selected taking into account that a change in a parameter may have an effect that is non-linear on the treatment itself. Therefore, in some embodiments, multiple sets of parameters may be defined for obtaining equivalent treatment effects. For example, it may be that delivery of 8000 stimulations randomly dispersed over a day would obtain a treatment effect which is equivalent to stimulations delivered at each cardiac beat for one hour at a heart rate higher than 90 bpm. In some embodiments, systems and/or devices for example as described herein (e.g. the system controller) are preprogrammed with a look-up table including parameter sets, which optionally lead to equivalent treatment effects and may be interchanged. In some embodiments, a treatment parameter is selected and/or calculated according to one more additional treatment parameters and/or according to a desired treatment effect.

In some embodiments, cardiac electrical stimulation treatment is delivered according to the plan, but variations may be made in the plan in response to actual cardiac activity. Optionally, variations are made in real time. For example, if an irregular beat is identified, stimulation at that beat may be skipped. In some embodiments, variations in the treatment plan are made in response to actual cardiac activity measured (and optionally monitored over time) by one or more sensors, such as via ECG measurement.

In some embodiments, the variations made in the plan are compensated for, for example so as to reach the general treatment goal. In some embodiments, compensating comprises updating one or more treatment parameters, such as: updating a duration of a treatment session; updating the rate of cardiac electrical stimulations; updating the current intensity of the stimulations; updating the number of electrodes being activated (for example so as to contact a different sized area of tissue); updating the time interval and/or number of beats between consecutive stimulations; and/or other treatment parameters.

In some embodiments, an implantable device is provided, including one or more leads for delivering the cardiac electrical stimulation and a controller configured for controlling stimulation via the leads. In some embodiments, the controller is configured for automatically updating one or more treatment parameters in response to a variation made in the treatment plan due to actual cardiac activity. In some embodiments, the controller is programmed with one or more treatment plans and one or more "fallback" instructions for updating the treatment parameters when treatment is being carried out and is optionally changed due to actual cardiac activity.

Some examples of "fallback" instructions include: lengthening a treatment session duration if the number of stimulations actually delivered is smaller than a set number of stimulations; increasing an intensity of the stimulation current if the total amount of energy delivered is lower than a set amount of energy to be delivered; increasing the rate of cardiac electrical stimulations if a treatment session time period has almost ended but not enough stimulations were actually delivered; updating a heart rate threshold for applying of stimulations if the actual heart rate over the treatment session (or a part of it) was not within the defined heart rate for delivery of stimulations.

As used herein the term "about" refers to ±20%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

As used herein, the term "treating" includes abrogating, substantially inhibiting, slowing or reversing the progression of a condition, substantially ameliorating clinical or aesthetical symptoms of a condition or substantially preventing the appearance of clinical or aesthetical symptoms of a condition.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of treating a patient with non-excitatory electrical heart failure therapy, the method comprising:
    a. identifying a patient that suffers of heart failure (HF) and presents pulmonary capillary wedge pressure indexed to cardiac output (PCWP/CO) slope greater than 2 mm Hg/L/min;
    b. implanting an implantable cardiac electrical stimulation device;
    c. providing an effective amount of non-excitatory electrical heart failure therapy using said implantable cardiac electrical stimulation device;
    wherein said providing is at least until said HF patient presents a reduction in said PCWP/CO slope and uses said PCWP/CO slope as a target for therapy.

2. The method according to claim 1, wherein said non-excitatory electrical heart failure therapy is cardiac contractility modulation therapy.

3. The method according to claim 1, wherein the HF condition is HF with preserved ejection fraction (pEF).

4. The method according to claim 1, wherein said patient has a hypertrophic right ventricle.

5. The method according to claim 1, wherein said patient has a hypertrophic ventricular septum.

6. The method of claim 1, wherein said providing is at least until said HF patient presents an increase in cardiac contractility.

7. The method of claim 1, wherein said providing is at least until said HF patient presents an increase in cardiac output.

8. The method of claim 1, wherein said providing is at least until said HF patient presents a reduction in arrhythmia level.

9. The method of claim 1, wherein said providing is at least until said HF patient presents a reduction in cardiac stiffness.

* * * * *